United States Patent [19]

Bangerter

[11] Patent Number: 4,667,065

[45] Date of Patent: May 19, 1987

[54] APPARATUS AND METHODS FOR ELECTRICAL SIGNAL DISCRIMINATION

[76] Inventor: Richard M. Bangerter, 1275 Meadow Ridge La., South Jordan, Utah 84065

[21] Appl. No.: 706,959

[22] Filed: Feb. 28, 1985

[51] Int. Cl.$^4$ .............................................. H04M 1/00
[52] U.S. Cl. ...................... 379/351; 381/46; 379/69
[58] Field of Search ................. 179/84 VF, 5 R, 5 P, 179/18 HB; 328/130.1, 129.1; 381/46, 38, 49, 94; 307/234, 517, 518

[56] References Cited

U.S. PATENT DOCUMENTS

| | | | |
|---|---|---|---|
| 3,482,045 | 12/1969 | Chase | 179/5 |
| 3,544,722 | 12/1970 | Hartfield et al. | 179/5 |
| 3,662,111 | 5/1972 | Rubinstein | 179/5 P |
| 3,761,632 | 9/1973 | Colman | 179/5 P |
| 3,843,841 | 10/1974 | Rubinstein | 179/5 P |
| 3,873,772 | 3/1975 | Dumler | 381/46 X |
| 3,885,108 | 5/1975 | Zock | 179/90 B |
| 3,899,645 | 8/1975 | Brafman | 179/90 AD |
| 3,920,907 | 11/1975 | Mullen, Jr. et al. | 381/46 |
| 3,925,622 | 12/1975 | Robinson | 179/18 BE |
| 3,985,956 | 10/1976 | Monti et al. | 381/46 |
| 3,989,900 | 11/1976 | Dibner | 179/5 P |
| 4,027,102 | 5/1977 | Ando et al. | 179/84 VF X |
| 4,219,698 | 8/1980 | Birilli et al. | 179/5 P |
| 4,284,849 | 8/1981 | Anderson et al. | 179/5 R |
| 4,296,277 | 10/1981 | Daneffel | 381/46 |
| 4,371,751 | 2/1983 | Hilligoss, Jr. et al. | 179/5 R |
| 4,492,820 | 1/1985 | Kennard et al. | 179/5 P |
| 4,559,602 | 12/1985 | Bates, Jr. | 381/46 X |

FOREIGN PATENT DOCUMENTS 0037573 10/1981 European Pat. Off. .
2218601 9/1974 France .
2005964 4/1979 United Kingdom .

OTHER PUBLICATIONS

Weed, "At the Touch of a Button, Transmitter Sends a Call for Help," *Telephony*, p. 24 (Mar. 30, 1981).
Newart Electronic Sciences, Inc., advertising brochure for "Phone Care".
Medical Alert, "Medical Alert" advertising brochure.
Aid-Call Ltd., "Aid Call" advertising brochure (England).
Metro Tel Corp., "Tel-Aid" advertising brochure (U.S.A.).
Artella Limited, "TellaSystems" advertising brochure.
"Ericare" advertising brochure.
Ariel Electronics, "Magnaray" advertising brochure (England).
MITEL Semiconductor, "DMTF Filter" (Canada).
Arma System, advertising brochure.
Untitled list dated Jan. 22, 1981.

*Primary Examiner*—James L. Dwyer
*Attorney, Agent, or Firm*—Workman, Nydegger & Jensen

[57] ABSTRACT

A novel apparatus and method for electronically determining whether audio signals which are present in an electrical audio device (for example, a telephone) are voice signals or, on the other hand, some type of supervisory or system-generated signals. Audio signal lines are connected to an audio detector and a digitizer. The audio detector provides an output which indicates the presence of an audio signal. The digitizer transforms any audio signal into a series of high and low level signals in some manner. The outputs from the audio detector and the digitizer are then provided to a central processing unit which is used to analyze the data. If an audio signal is detected and the digitized audio signal is determined to have a regular periodic pattern, it is presumed that the audio signal is some type of system-generated supervisory tone. If, on the other hand, the digitized audio signal does not have a regular periodic pattern, it is presumed that the audio signal is a voice signal. Accordingly, upon detecting an irregular audio signal, the central processing unit produces an output signal which can be detected by associated circuitry as indicating that voice signals are present.

37 Claims, 20 Drawing Figures

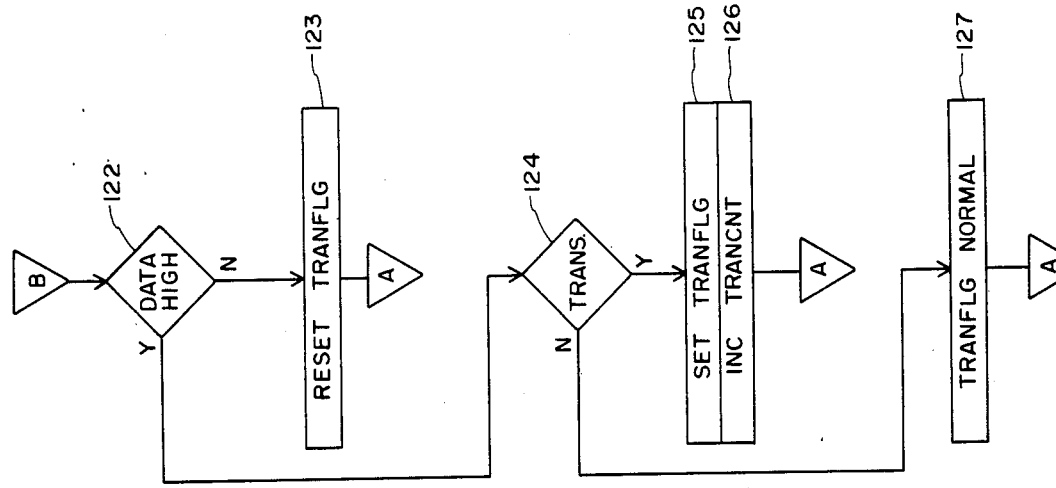
FIG. 8B
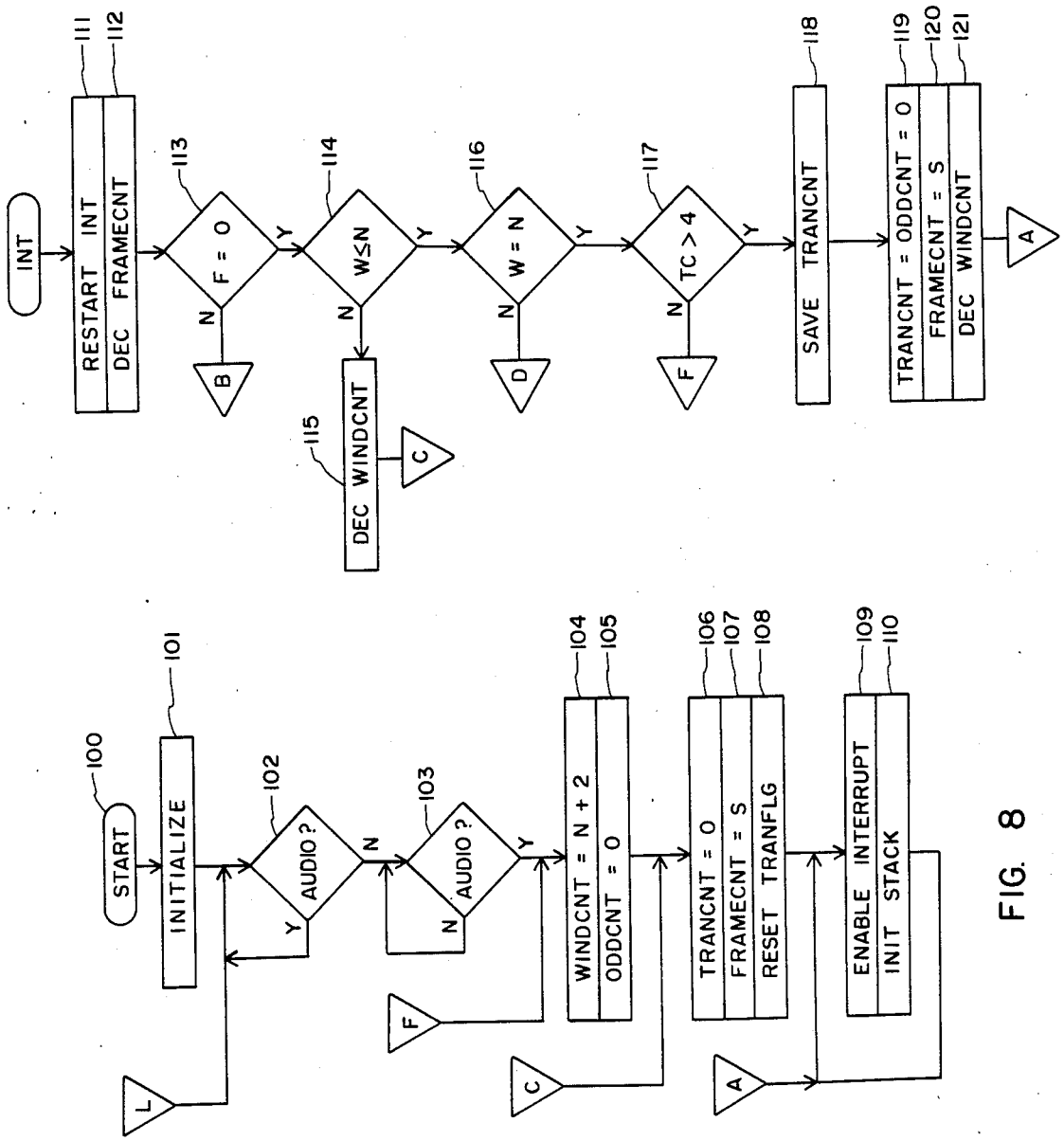
FIG. 8A
FIG. 8

APPARATUS AND METHODS FOR ELECTRICAL SIGNAL DISCRIMINATION

BACKGROUND

1. The Field of the Invention

This invention relates to devices and methods for discriminating between different types of electrical signals and, more particularly, to novel apparatus and methods for electronically distinguishing between voice signals and system-generated signals in an electrical audio device.

2. The Prior Art

During recent years, largely as a result of the significant developments in the microprocessor arts, a number of devices have been developed which are designed to call one or more specified telephone numbers and then transmit and/or receive an audio message. For example, security devices have been developed which will, upon being actuated, call one or more designated telephone numbers and deliver an emergency message and/or a request for help. Similar devices are now being used by many doctors, dentists, and other professionals to call patients or clients and remind them of scheduled appointments. Many department stores are likewise using such devices to call customers and inform them that their has order has been received. Also, marketing companies and salesmen have begun using automatic calling devices to contact potential clients or customers, to inform them of a new product or service, and/or to obtain answers to particular questions. In fact, there are presently numerous types of such microprocessor-based devices which are being used in various ways to perform similar automatic telephone calling functions.

When using any such automatic calling device, it is, of course, intended that the audio message will actually be heard by an individual who answers the called telephone. Nevertheless, one of the principal challenges associated with these devices has been to develop a dependable way of determining that a party has, in fact, answered the called telephone.

The design of early automatic calling devices often simply ignored the problem of detecting whether the called telephone had been answered. Thus, some of these early devices would simply dial the designated telephone number and then deliver the message. It will, of course, be appreciated that the called party would often not receive the audio message at all, such as, for example, if the party was not home or if the telephone line was busy. In other cases, the called party would receive only part of the message, since the audio message would have been started before the called party ever answered the telephone.

In an effort to overcome these problems, some of the early automatic calling devices were designed so as to repeat the audio message a specified number of times after dialing the telephone number and before disconnecting. Thus, for example, the device might dial a telephone number and then repeat the audio message two times. As a result, a party might answer the telephone in the middle of the first time through the message, but would still be able to receive the entire message before the device was disconnected. Understandably, however, this method of message delivery could be rather annoying to call recipients. More significantly, repeating the audio message several times still did not ensure that the called party ever received the message at all, such as, for example, if the telephone line was busy or if the called party did not answer.

Recognizing the need for some type of telephone answer detection, a number of attempts have been made by those skilled in the art to incorporate into automatic calling devices some way of detecting that the called telephone has been answered. In this way, it was hoped that the device could then be designed so as to deliver the audio message only after the called telephone was answered, thereby avoiding the problems outlined above. However, the devices 22 and methods which have heretofore been used to detect whether a called telephone has been answered have proven to be largely inadequate and undependable.

One method which has previously been used to determine whether a called telephone has been answered is to require the answering party to transmit a recognizable answer signal back to the calling device. For example, the calling device could be designed to dial a designated telephone number and then wait to receive a specific tone or other answer signal before transmitting the audio message. Such an answer signal could, for example, be a conventional dual-tone multifrequency signal which is transmitted manually from the telephone of the answering party. Alternatively, the answer signal could comprise a tone or other signal which is transmitted automatically by a second device that is connected in some way to the called telephone.

While this method of telephone answer detection may be quite reliable, it has some significant disadvantages. First, since telephone companies do not provide any universal telephone answer signal, the calling device cannot generally be used to call a particular party until prior arrangements have been made with that party. For example, this answer detection method typically requires either that the called party first know the required answer signal to transmit or that a piece of special equipment be previously installed in connection with the party's telephone. As a result, this method of detecting that a called telephone has been answered has proven to be quite cumbersome and inconvenient and may also be relatively expensive. Moreover, due to the required prior arrangements, this method of telephone answer detection may even preclude the use of the automatic calling device for many of the purposes outlined above.

As alluded to previously, in many areas throughout the United States, the telephone company provides an electronic signal indicating that a telephone has been answered. This signal generally comprises reversing the voltage polarity on the telephone lines (that is, causing the electrical current to flow through the telephone lines in an opposite direction after the telephone has been answered). A reversal in voltage polarity is relatively easy to detect, and such detection can be done with a great degree of reliability. Hence, some prior art devices have attempted to detect an answered telephone by simply detecting a reversal of voltage polarity on the telephone lines.

The major impediment to this method of detecting an answered telephone is that the telephone company in many parts of the United States, as well as in foreign countries, does not always provide voltage polarity reversal when a telephone is answered. As a result, this method of detecting an answered telephone, while simple and quite reliable, cannot be used uniformly on all telephone systems. Thus, if a telephone call is placed into an area in which voltage polarity reversal is not provided as an answer signal, no answer will be detected by the calling device.

Still other prior art devices have attempted to detect the answering of a called telephone by monitoring the telephone system's call progress tones. In general, there are only four different types of call progress tones to be monitored: (1) a dial tone, (2) a ringing tone, (3) a line-busy signal (slow busy signal), and (4) an all trunk busy signal (fast busy signal). By monitoring the call progress tones, for example, it can be determined whether the called telephone has started ringing. If the telephone thereafter stops ringing, it may be presumed that the telephone was answered.

Call progress tones have previously been monitored by distinguishing between the timing of the audio signals associated with each tone. For example, a ringing tone may comprise a two-second audio tone followed by four seconds of silence, with this pattern then repeating. Thus, if this audio signal pattern were detected on the telephone lines, the calling device would assume that the called telephone is now ringing.

Again, one of the chief problems associated with this method of detecting if a called telephone has been answered is due to the nonuniformity between various central offices of the telephone sytem. For example, in some areas, a ringing tone may comprise a two-second tone followed by only three seconds of silence, while other areas may maintain the pattern comprising four seconds of silence, as set forth above. As a result, it may not be possible to adequately recognize and/or distinguish between various call progress tones; and this nonuniformity in timing thus makes this method unreliable for universal use in detecting whether a telephone has been answered.

In addition, the above-described method of detecting an answered telephone may not respond quickly enough to the called party. For example, the party may answer the telephone in the middle of a ringing tone and say "hello." The party may then wait four seconds before saying "hello" again, and the calling device would generally perceive this as a continuation of the ringing tone. In all likelihood, the called party would soon hang up the telephone, and the calling device would not have yet delivered the audio message.

BRIEF SUMMARY AND OBJECTS OF THE INVENTION

In view of the foregoing, it is a primary object of the present invention to provide a dependable apparatus and method for electronically detecting that a called telephone has been answered.

It is also an object of the present invention to provide an apparatus and method for detecting that a called telephone has been answered which does not require any special action on the part of the called party.

Additionally, it is an object of the present invention to provide an apparatus and method for detecting that a called telephone has been answered which does not require the use of any special equipment in connection with the called telephone.

It is an additional object of the present invention to provide an apparatus and method for detecting that a called telephone has been answered which is not dependent upon any particular signal generated by the telephone system.

Further, it is an object of the present invention to provide an apparatus and method for detecting that a called telephone has been answered which is capable of reliable, universal application on any telephone system.

It is a still further object of the present invention to provide an apparatus and method for detecting that a called telephone has been answered which is not dependent upon any specific timing or pattern of audio signals.

Also, it is an object of the present invention to provide an apparatus and method for accurately distinguishing between audio voice signals and any supervisory or other system-generated signals which may be present in an electrical audio device.

Consistent with the foregoing objects, the present invention is directed to a novel apparatus and method for electronically determining whether audio signals which are present in an electrical audio device (such as, for example, a telephone), are voice signals or, on the other hand, some type of supervisory or system-generated signals. While this invention is described herein as it may be applied in detecting that a called telephone has been answered, it will be appreciated that numerous other applications of this invention can be made. Thus, the following summary and description is intended by way of illustration only.

In accordance with one presently preferred embodiment of the invention, telephone lines are connected to an audio detector and a digitizer. The audio detector provides an output which indicates either that there is or is not an audio signal on the telephone lines. The digitizer transforms any audio signal on the telephone lines into a series of high and low level signals in some manner. For example, in one presently preferred embodiment, the digitizer produces a high level signal whenever the instantaneous voltage level of the incoming audio signal is greater than a specified reference value, and it produces a low level signal at all other times.

The outputs from the audio detector and digitizer are then provided to a central processing unit which is used to analyze the data. If an audio signal is detected on the telephone lines and the digitized audio signal has a regular periodic pattern, it is presumed that the audio signal is some type of supervisory or call progress tone which is generated by the telephone system. If, on the other hand, the digitized audio signal does not have a regular periodic pattern, it is presumed that the audio signal is a voice signal. Accordingly, upon detecting an irregular or random audio signal, the central processing unit produces an output signal which can be detected by associated circuitry as indicating that the called telephone has been answered.

These and other objects and features of the present invention will become more fully apparent from the following description and appended claims, taken in conjunction with the accompanying drawings.

DETAILED DESCRIPTION OF THE PREFERRED EMBODIMENTS

It will be readily appreciated that the components of the present invention, as generally described and illustrated in the figures herein, could be arranged and designed in a wide variety of different configurations. Thus, the following more detailed description of the embodiments of the apparatus and methods of the present invention, as represented in FIGS. 1 through 9H, is not intended to limit the scope of the invention, as claimed, but it is merely representative of the presently preferred embodiments of the invention.

Moreover, as mentioned above, the present invention is described and illustrated herein as it may be applied in connection with a telephone system to determine whether a called telephone has been answered. Various other applications for this invention are, of course, possible, and such applications would be readily apparent to those skilled in the art. Thus, the following description is not intended to limit this invention to any particular application.

The presently preferred embodiments of the invention will be best understood by reference to the drawings, wherein like parts are designated with like numerals throughout.

General Discussion

If the audio signal on a telephone line was displayed graphically to a viewer, one would notice a marked difference between the audio signal which is present during any of the system-generated call progress tones and the audio signal which is present as a result of a human voice. This difference can be appreciated by examining FIGS. 1 and 2.

Figure 1:
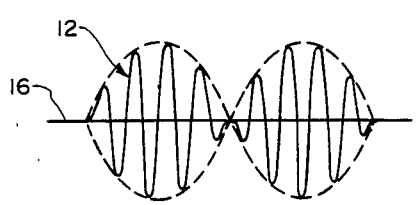
FIG. 1 is a graphical representation of the audio signal which is present on the telephone lines as a result of a call progress tone.

In FIG. 1, the audio signal 12 which results from a call progress tone is shown graphically. As shown, audio signal 12 has a very regular pattern. Moreover, while the specific pattern of audio signal 12 may vary depending upon the particular call progress tone which is present on the telephone lines, audio signal 12 will have a regular periodic pattern in all cases. (As used herein, the term "regular periodic pattern" means a waveform which is predictable and which repeats itself over a certain period of time.)

Figure 2:
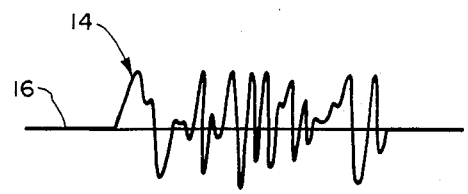
FIG. 2 is a graphical representation of the audio signal which is present on the telephone lines as a result of voice signals.

With reference to FIG. 2, the audio signal 14 which results from a human voice can be seen to be quite different from audio signal 12 of FIG. 1. Unlike audio signal 12, audio signal 14 has a very irregular pattern, and it does not repeat itself on any periodic basis.

The apparatus and methods of the present invention take into account the above-noted fundamental differences between system-generated call progress tones and voice signals. This is done electronically such that an irregular or random audio signal is immediately recognized as a voice signal without the need for any human intervention. Significantly, since the present invention is based upon the inherent differences between system-generated call progress tones and voice signals, it is not dependent upon either the use of special equipment in connection with the called telephone, an answer signal provided by the telephone company, or the specific timing or pattern of any call progress tones. Thus, unlike the prior art devices, the present invention is capable of universal application for purposes of telephone answer detection on any telephone system.

In order to electronically analyze an audio signal which is present on the telephone lines, the audio signal is first "digitized" such that the incoming audio signal is transformed into uniform high voltage signals (such as, for example, five volts), and uniform low voltage signals (such as, for example, zero volts), which can be received and processed by a digital computer. This "digitization" can be done in a number of ways.

For example, the audio signal may be provided directly to a conventional analog-to-digital converter which will immediately transform the audio signal into a series of digital, numerical values. Such numerical values can then be provided to a digital computer for analysis.

Alternatively, the audio signal may be digitized by transforming it into a single series of high voltage signals and low voltage signals. This can be done in a number of ways so as to facilitate analyzing the audio signal in accordance with the present invention.

Figure 1A:
FIG. 1A is a graphical representation of the audio signal of FIG. 1 after it has been digitized in accordance with one presently preferred embodiment of the present invention.
Figure 2A:
FIG. 2A is a graphical representation of the audio of FIG. 2 after it has been digitized in accordance with one presently preferred embodiment of the present invention.

For example, as depicted in FIGS. 1A and 2A, the audio signal may be digitized such that a high signal results whenever the instantaneous voltage level of the incoming audio signal is greater than a specified reference value 16 (see FIGS. 1 and 2), and such that a low signal results whenever the instantaneous voltage level of the incoming audio signal is below the specified reference value 16. By comparing FIG. 1A to FIG. 1, therefore, it will be seen that the digitized audio signal 13 of FIG. 1A is high whenever audio signal 12 of FIG. 1 is above reference value 16. At the same time, digitized audio signal 13 is low whenever audio signal 12 is below reference value 16. A comparison between FIGS. 2 and 2A will show that audio signal 15 of FIG. 2A similarly corresponds to audio signal 14 of FIG. 2. Thus, FIGS. 1A and 2A represent one way of digitizing the audio signals of FIGS. 1 and 2, respectively.

Comparing the digitized audio signals 13 and 15, it will be seen that digitized audio signal 13, like audio signal 12, still has a regular periodic pattern. Likewise, digitized audio signal 15 has an irregular, random pattern, as does audio signal 14. Thus, the digitized audio signals 13 and 15 of FIGS. 1A and 2A, respectively, can be analyzed by a computer, and the digitized audio signal 15 of FIG. 2A can be immediately recognized as corresponding to an audio voice signal because of its irregularity.

Another way of digitizing an incoming audio signal 12 or 14 would be to provide a high signal whenever the slope of the incoming audio signal is positive (that is, when its graphical representation slopes upward and to the right), and a low reading whenever the slope of the incoming audio signal is negative (that is, when the graphical representation of the audio signal slopes downward and to the right). Such a method of digitization would also show that any call progress tone results in a regular, periodic digitized audio signal, while a voice signal results in a very irregular digitized audio signal.

Once the audio signal on the telephone lines has been digitized, the audio signal is then sampled and analyzed during successive time periods. Such time periods are represented graphically in FIG. 3.

Figure 3:
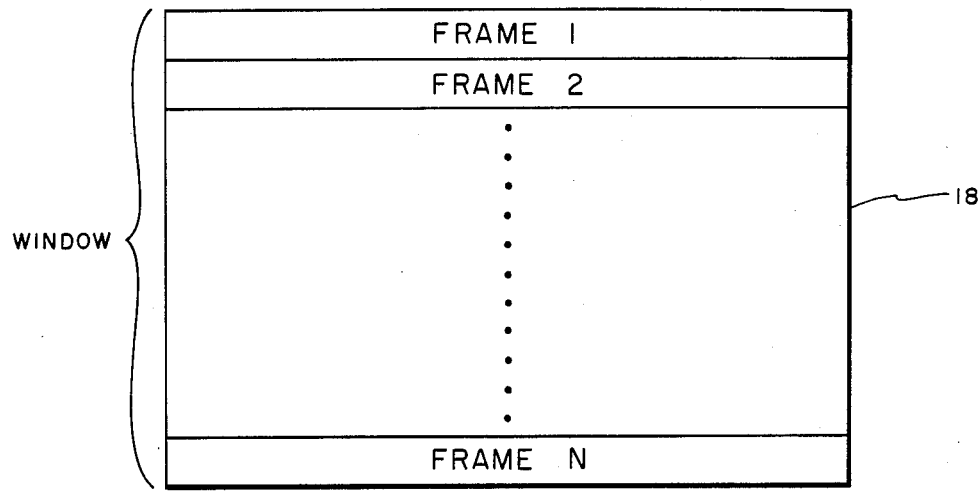
FIG. 3 is a graphical illustration of the successive time periods during which data is sampled and analyzed in accordance with one presently preferred embodiment of the present invention.

FIG. 3 illustrates a time period 18 during which the digitized audio signal is sampled and analyzed. Such time period is hereafter referred to as a "window." Window 18 is subdivided into a specified number of smaller time periods which are hereafter called "frames." Finally, during each frame, the digitized audio signal is sampled a specified number of times.

Due to the high speed of microprocessors and other digital computing devices, the required sampling and analyzing steps can be done very rapidly. For example, it may be decided to take one sample every 160 microseconds and to take 132 samples during every frame. A frame would, therefore, last 21.12 milliseconds. It might then be decided to have 13 frames during every window. In such case, a window would last 0.27456 seconds (274.56 milliseconds), during which period of time 1,716 samples of the digitized audio signal would be taken and analyzed.

Figure 4:
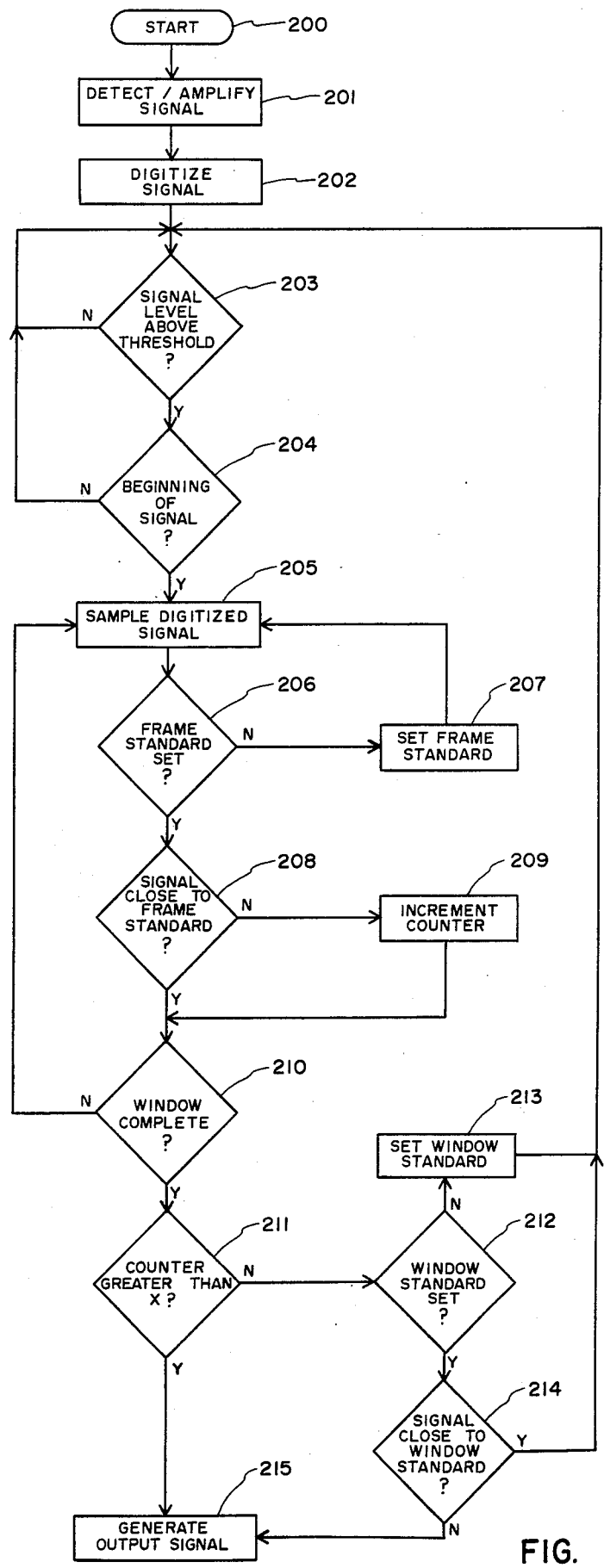
FIG. 4 is a general flow chart diagram illustrating one presently preferred embodiment of the present invention.

Reference is now made to FIG. 4 which illustrates one presently preferred embodiment of the present invention.

As shown, the electrical signal discrimination apparatus and method of the present invention begins at step 200 and proceeds immediately to step 201, wherein an electrical signal is detected and/or amplified. Thereafter, the electrical signal is digitized in some manner, as outlined above, at step 202.

At step 203, it is determined whether the energy level of the electrical signals is above a specified threshold level. Thus, the analysis of noise signals is avoided. In this regard, it is noted that noise signals, like voice signals, are random in nature, although the energy level of noise signals is significantly less than that of voice signals. Thus, in order to avoid the processing of mere electrical noise, the apparatus and method of the present invention remains at step 203 until an electrical signal is detected which is above the specified threshold energy level.

Once an electrical signal above the specified threshold level is detected at step 203, the system proceeds to step 204 to determine whether it is the beginning of such an electrical signal. The purpose of this step is to avoid potentially erroneous results due to analyzing only the end of an electrical signal.

After the beginning of an electrical signal which is above the specified threshold energy level is detected at step 204, the system proceeds to step 205 to begin sampling and analysis of the electrical signals. Advantageously, step 205 may not actually be commenced simultaneously with the beginning of the electrical signal in order to avoid detecting irregularities which may be present only at the very beginning of the signal. Thus, for example, one or more frames of data (see FIG. 3) may be discarded prior to the commencement of a window 18 in step 205.

At step 205, the designated number of samples are taken and analyzed during the first time period. Then, at step 206, it is initially determined that a frame standard has not yet been set. Accordingly, a frame standard is established at step 207, and the system returns to step 205 to continue sampling. As set forth in more detail below, the frame standard serves as a comparison reference for comparing the signal samples taken during the various subsequent frames in a window.

Samples are then taken at step 205 during subsequent frames of window 18. After the completion of each frame, the system passes through step 206 to step 208 to determine whether the signal during the frame just completed was sufficiently close to the frame standard. If it is determined that the signal was not sufficiently close to the frame standard, a counter is incremented at step 209 to indicate the possibility that random voice signals may be present, since the digitized electrical signal does not appear to have any regular periodic pattern. The system then moves through step 210 and back to step 205 to complete the remaining frames in the window.

At the completion of the window, the system moves from step 210 to step 211 and determines whether the counter has been incremented more than a specified number (x) of times, thereby indicating a very irregular or random signal pattern. If the counter has been incremented more than a s specified number of times, the system moves to step 215 and generates an output signal indicating the presence of random electrical signals. In the case of telephone audio signals, this indicates the presence of voice signals and that the telephone has been answered.

In addition, after the completion of a window in which the counter has not been incremented more than the specified number of times, the system moves to step 212 to determine whether a window standard has been set. If not, the system proceeds to step 213 to establish such a window standard. The window standard may, for example, comprise the frame standard which was set in the first window during which the electrical signal in question was analyzed.

Once a window standard has been set, the system thereafter, upon reaching step 212, moves to step 214 to determine whether the signals analyzed during the window just completed are sufficiently similar to the window standard. If the signals are sufficiently close, the system returns to step 203 and commences a new window. If, on the other hand, the signals are not sufficiently close to the window standard, the system moves to step 215 and generates an output signal indicating an irregular random signal pattern.

It will be appreciated by those skilled in the art that the digitized audio signal may be sampled and analyzed in accordance with the present invention in any of a number of ways. In one presently preferred embodiment, for example, the system is designed to count the number of low to high transitions which occur in the digitized audio signal during each frame. Thus, the digitized audio signal is sampled a specified number of times during each frame and a counter is incremented each time it is detected that the digitized audio signal has jumped from a low level reading to a high level reading. The numerical value stored in the counter at the end of each frame thus indicates the number of low to high signal transitions which occurred during that frame. Finally, the number of low to high transitions during the various frames and windows is then compared, as outlined above, and an irregularity in the number of low to high transitions is used as an indication that voice signals are present on the telephone lines.

Alternatively, or in combination with the foregoing method, the "duty cycle" of the digitized audio signal could be sampled and analyzed. The duty cycle is defined as the ratio of the time during which the digitized audio signal is high to the total time during which samples are taken. Thus, a timing device could be used to keep track of the time during which the digitized audio signal is high during each frame. This measured time value could then be compared for subsequent frames and windows, as outlined above, with any irregularity in the duty cycle indicating the presence of voice signals on the telephone lines. Alternatively, signals could be sampled and analyzed during successive equal time periods and the number of times during each such time period that the digitized audio signal is a high voltage signal could be counted. That number would then be proportional to the "duty cycle" of the digitized audio signal.

2. The System Structure

Figure 5:
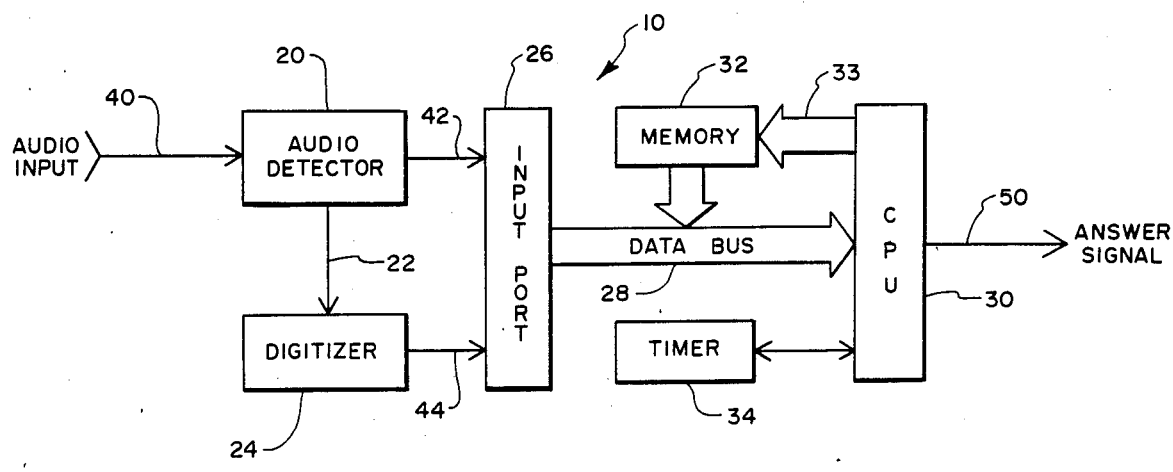
FIG. 5 is a functional block diagram of the electronic circuitry of one presently preferred embodiment of the present invention.

One presently preferred embodiment of a system, generally designated at 10, which may be used to carry out the present invention is illustrated in the functional block diagram of FIG. 5. It will, however, be appreciated that a number of different system configurations may be used in accordance with the present invention. For example, those skilled in the art will readily recognize a number of obvious modifications to the functional block diagram of FIG. 5 which are, nevertheless, within the scope of the present invention.

As depicted in FIG. 5, in one presently preferred embodiment of detection system 10, the audio signal from the telephone lines is provided to detection system 10 on line 40 as an input to an audio detector device 20. Such audio signal is then provided through audio detector 20 on line 22 to a digitizer 24. Alternatively, the audio signal may be provided simultaneously to both audio detector 20 and digitizer 24 without any interconnection between audio detector 20 and digitizer 24.

The purpose of audio detector 20 is to indicate the presence of any audio signal on the telephone lines, which is above a certain threshold level, such as, for example, −40 dBm. Upon detection of such an audio signal, therefore, audio detector 20 transmits a signal on line 42 to input port 26. Audio detector 20 makes no distinction between the various types of audio signals which may be present on the telephone lines. Thus, audio detector 20 detects any clicks, hissing noises, voice signals, and call progress tones which are above the specified threshold level and, in each case, indicates by a signal on line 42 that some type of audio signal is present.

Digitizer 24 digitizes the incoming audio signal in some acceptable manner, as outlined above. The digitized audio signal is then transmitted on line 44 to input port 26.

The data provided by audio detector 20 and digitizer 24 to input port 26 is sampled and analyzed by a central processing unit (CPU) 30. The operating instructions for CPU 30 are stored in a suitable memory device 32, and such instructions are communicated in a conventional fashion to CPU 30 on data bus 28 in response to signals generated by CPU 30 on address bus 33. The timing of the sample taking and the analysis of data by CPU 30 is controlled by a timer 34 which is connected to CPU 30 as shown.

In accordance with the foregoing, in response to both the instructions stored in memory device 32 and the timing signals generated by timer 34, CPU 30 periodically samples and analyzes the data provided at input port 26. After the completion of a window, CPU 30 then determines whether the sampled data has an irregular, random pattern and whether voice signals are, therefore, present on the telephone lines. If voice signals are determined to be present, CPU 30 stops sampling the data and generates an answer signal on line 50.

Figure 6:
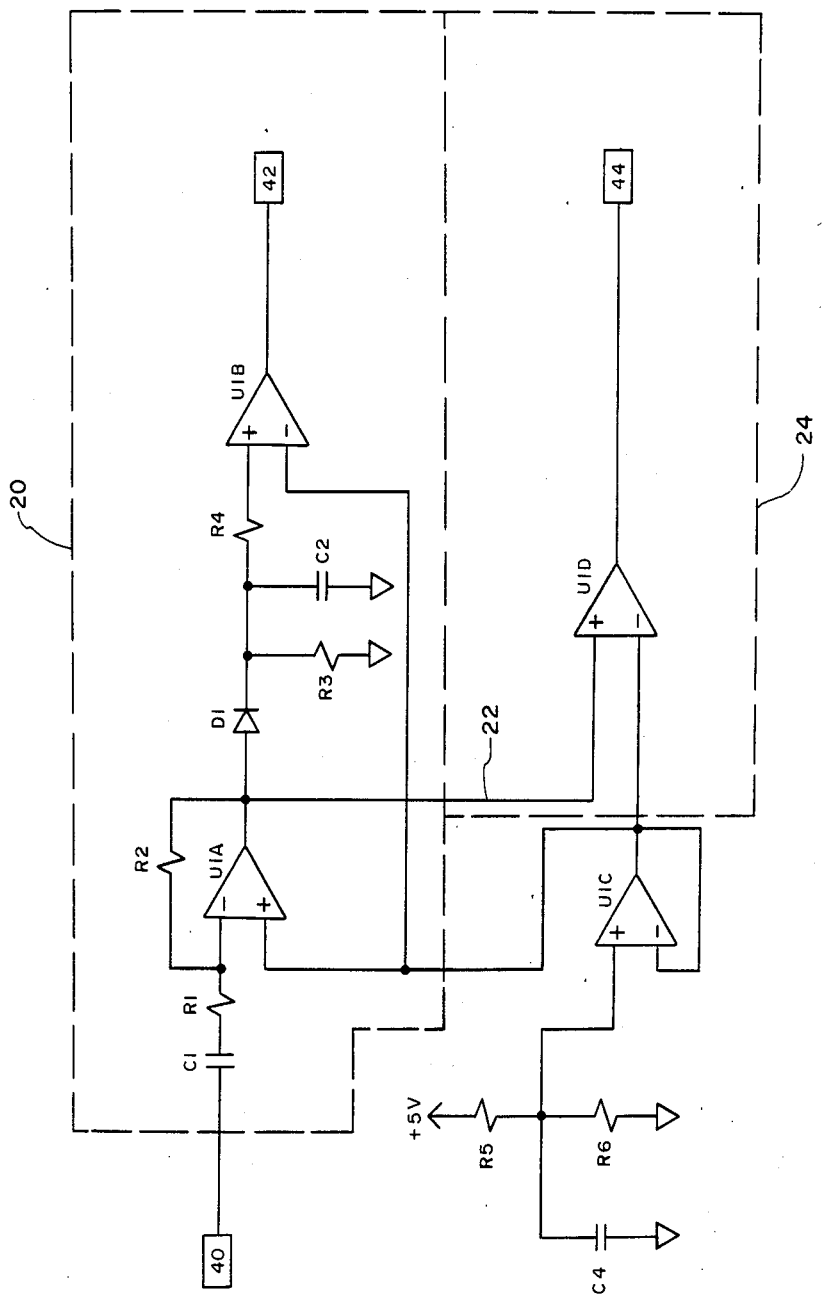
FIG. 6 is a schematic diagram of one presently preferred embodiment of the analog portion of the functional block diagram of FIG. 4.
Figure 6A:
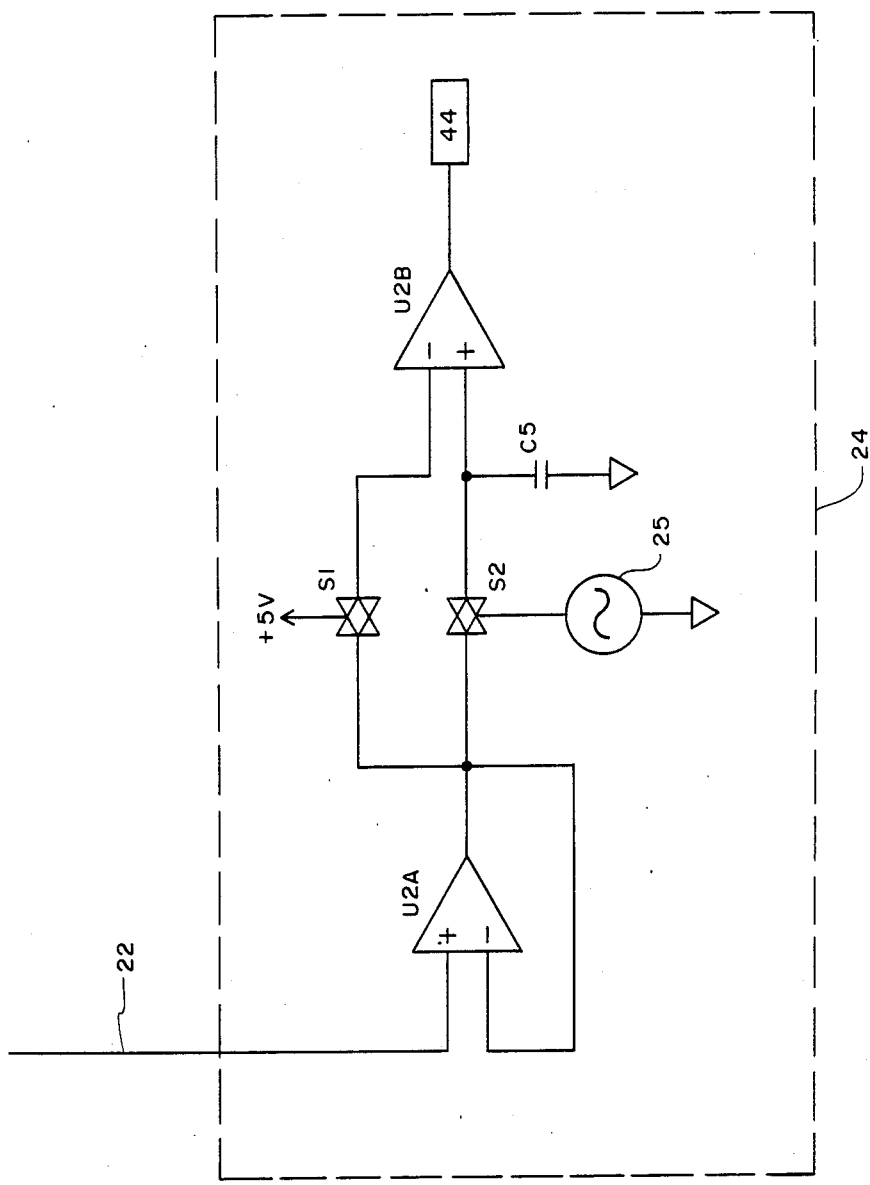
FIG. 6A is a schematic diagram illustrating a second presently preferred embodiment of the digitizer of the present invention.
Figure 7:
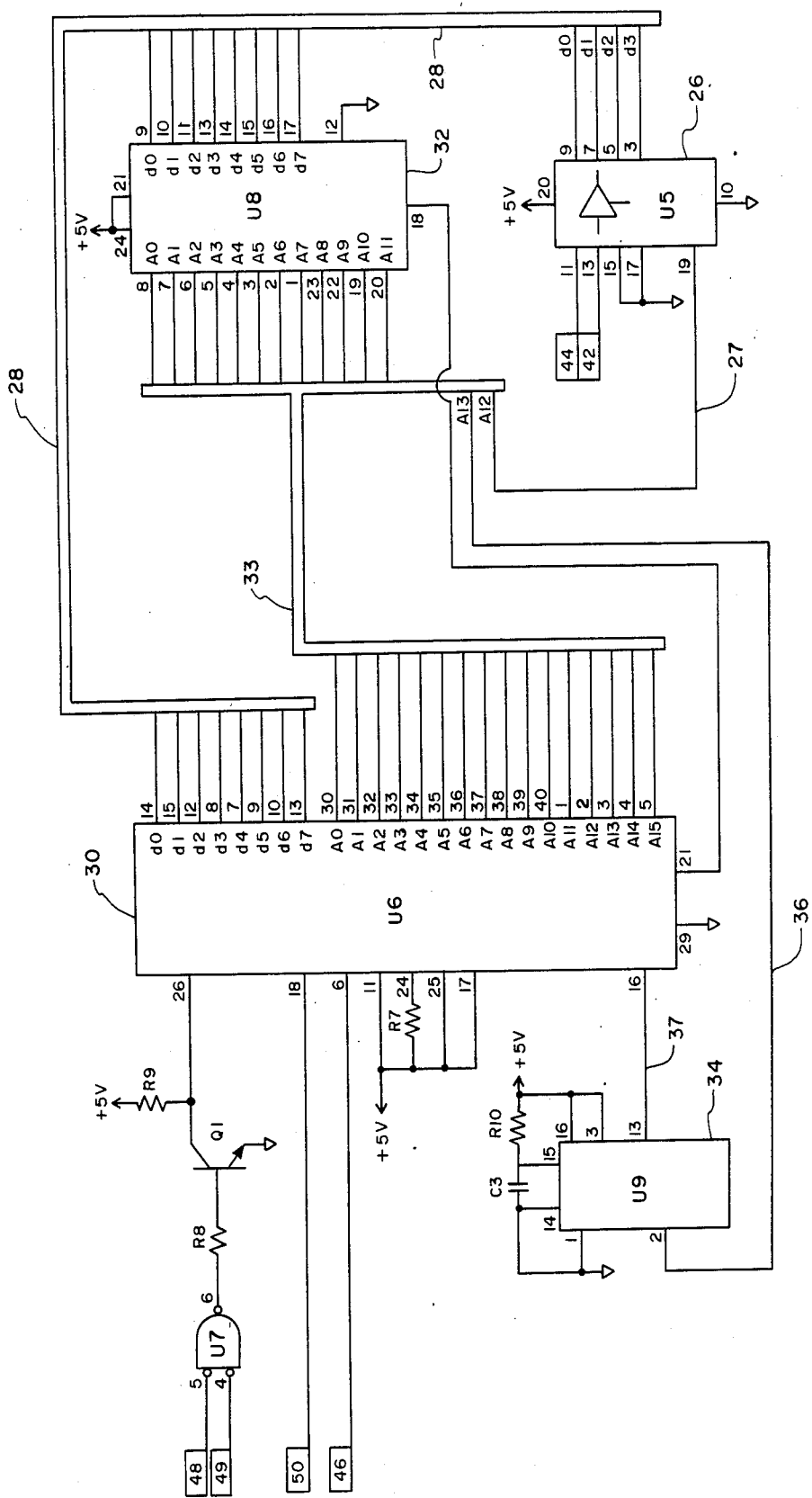
FIG. 7 is a schematic diagram of one presently preferred embodiment of the digital portion of the functional block diagram of FIG. 4.

Reference is next made to FIGS. 6, 6A and 7, which illustrate in more detail preferred embodiments of a schematic diagram derived from the block diagram of FIG. 5. Those of ordinary skill in the art will, of course, appreciate that various modifications to the detailed schematic diagrams of FIGS. 6, 6A and 7 may be easily made without departing from the essential characteristics of the invention, as described above. Thus, the following description of the detailed schematic diagrams of FIGS. 6, 6A and 7 is intended only as an example, and simply illustrates one presently preferred embodiment of a schematic diagram that is consistent with the foregoing description of FIG. 5 and the invention as claimed herein. The various circuit stages corresponding to each of the functional blocks of FIG. 5 are identified in FIGS. 6, 6A and 7 with like numerals.

FIG. 6 illustrates the analog portion of the functional block diagram of FIG. 5. That is, FIG. 6 is a representation of one presently preferred embodiment of audio detector 20 and digitizer 24.

As shown, audio detector 20 may comprise two operational amplifiers (op amps) U1A and U1B. Amplifier U1A receives the audio signal from contact point 40 through capacitor C1 and resistor R1 and provides a large increase in signal strength (gain). For example, resistors R1 and R2 may be selected so as to provide op amp U1A with a signal gain of approximately 200.

The output of op amp U1A is used to charge capacitor C2 through diode D1, with capacitor C2 discharging through resistor R3. Op amp U1B is then used to compare the voltage across capacitor C2 with a reference voltage which is determined by the voltage divider comprising resistors R5 and R6. Op amp U1C acts as a voltage follower to further stabilize the reference voltage, and capacitor C4 reduces noise. Op amp U1B thus acts as a comparator and provides a high signal at contact point 42 whenever the level of the audio input is greater than a specified threshold level. For example, the various components of audio detector 20 may be selected such that a high signal is provided at contact point 42 whenever the level of the audio signal at contact point 40 is greater than approximately −40 dBm.

As also shown in FIG. 5, digitizer 24 may comprise an op amp U1D. As shown, the amplified audio signal from op amp U1A is provided on line 22 to op amp U1D, which functions as a voltage comparator. Thus, whenever the instantaneous voltage level of the amplified audio signal is above the specified reference level, a high voltage signal will be provided at contact point 44. (See FIGS. 1 and 1A and FIGS. 2 and 2A.)

It will be appreciated, therefore, that the embodiment of audio detector 20 and digitizer 24 which is illustrated in FIG. 5 provides a high reading at contact point 42 whenever audio is present and provides a digitized audio signal at contact point 44. Hence, the analog audio signal which was provided at contact point 40 has now been digitized into two separate digital data signals which are provided at contact points 42 and 44.

FIG. 6A illustrates a second preferred embodiment of digitizer 24. As shown, digitizer 24 may comprise two op amps U2A and U2B. Op amp U2A acts as a voltage follower and is connected to line 22, as shown. The output of op amp U2A is then provided to two switches S1 and S2. Switches S1 and S2 may, for example, comprise analog gates which are connected as shown to a positive voltage source and to a frequency source 25. Frequency source 25 may, for example, oscillate at a frequency of 23 kHz. In this way, switch S2 is continuously opened and closed while switch S1 is always open.

As illustrated in FIG. 6A, a capacitor C5 is connected between switch S2 and op amp U2B. As a result, capacitor C5 acts as a sample and hold device and is charged to the voltage level on line 22 whenever switch S2 is open.

Finally, op amp U2B acts as a voltage comparator to compare the voltage capacitor C5 with the instantaneous voltage on line 22, as transmitted through op amp U2A and switch S1. It will, therefore, be appreciated that op amp U2B produces a high voltage signal at contact point 44 whenever the instantaneous slope of the incoming audio signal is positive and produces a low voltage signal at contact point 44 at all other times.

One presently preferred embodiment of the digital portion of the block diagram of FIG. 5 is illustrated in FIG. 7. The various circuit components depicted in FIG. 7 are connected together as indicated in conventional fashion by the pin numbers adjacent integrated circuits U5 through U9. Thus, for example, line 27, which corresponds to bit A12 of address bus 33, is connected to pin number 19 of integrated circuit U5.

As shown in FIG. 7, input port 26 may comprise an integrated circuit U5. Contact points 42 and 44 are connected to integrated circuit U5, as shown, and U5 thus receives the above-mentioned digitized data from the circuitry of FIG. 5.

Integrated circuit U5 is also connected, as shown, to data bus 28. Thus, when an enable signal is received by integrated circuit U5 on line 27, the digitized data at contact points 42 and 44 is transmitted through integrated circuit U5 onto data bus 28. As previously indicated, line As also shown in FIG. 7, CPU 30 may comprise an integrated circuit U6. A clock pulse may be provided to U6 at contact point 46. For example, contact point 46 may be connected to a clock pulse having a frequency of 2 megahertz.

A means is also provided for enabling integrated circuit U6. This enabling means may, for example, comprise a logic gate U7, the associated resistors R8 and R9 and a transistor Q1. In this way, whenever a low voltage signal is received simultaneously at both contact points 48 and 49, integrated circuit U6 will be enabled and will commence operation. If, on the other hand, either of contact points 48 or 49 has a high voltage signal, integrated circuit U6 will be disabled.

It will be readily appreciated that a number of different methods could be used to enable integrated circuit U6. The circuitry illustrated in FIG. 7 has been configured in order to facilitate using this invention in conjunction with an automatic calling device having a tone generator of some sort. Contact points 48 and 49 may thus be connected to such tone generator such that integrated circuit U6 is enabled whenever no tone is being produced by the tone generator.

The operating instructions for integrated circuit U6 are stored in memory device 32 which comprises an integrated circuit U8, as shown. Integrated circuit U8 may advantageously comprise a read-only memory device, and integrated circuit U8 is connected to integrated circuit U6, by means of both data bus 28 and address bus 33, in a conventional fashion such that appropriate instructions which are stored in integrated circuit U8 may be transmitted on data bus 28 for execution by integrated circuit U6.

Timer 34 of answer detection device 10 may comprise an integrated circuit U9, which is configured, as shown, so as to comprise a monostable device. Thus, whenever a trigger pulse is received on line 36 (which may, as shown, correspond to bit A13 of address bus 33), integrated circuit U9 would generate a high voltage signal on output line 37 for a period of time which is determined by the values of capacitor C3 and resistor R10. At the end of that time period, integrated circuit U9 would produce a low signal on line 37 which would then interrupt integrated circuit U6. As set forth in more detail below, this configuration may be used to assure that data samples are taken by integrated circuit U6 at regular intervals.

In operation, integrated circuit U6 will not function until it is enabled by low voltage signals at contact points 48 and 49. Once enabled, integrated circuit U6 will receive and execute instructions from integrated circuit U8. At the appropriate times, integrated circuit U6 will provide a signal on bit A12 of address bus 33, which bit corresponds to line 27 connected to integrated circuit U5. The signal on line 27 will enable integrated circuit U5 and data will then be transmitted through integrated circuit U5 and onto data bus 28, such that the data can be sampled and analyzed by integrated circuit U6.

Prior to taking each sample, integrated circuit U6 will also send a signal on bit A13 of address bus 33, which bit corresponds to line 36 connected to integrated circuit U9. As outlined above, this will result in a high voltage signal on line 37 for the duration of the predesignated time period. When the signal on line 37 again is dropped to a low voltage level, integrated circuit U6 will be interrupted, thereby indicating that the next data sample should now be taken.

Upon sampling and analyzing the data, integrated circuit U6 may determine that the digitized audio signal does not have any regular pattern. In such case, all data processing will be halted, and integrated circuit U6 will produce a low voltage signal at contact point 50. Such low voltage signal may then be detected by associated circuitry as indicating that the called telephone has been answered.

Table I below indicates various values and types for the specific circuit components illustrated in FIGS. 6, 6A and 7. Those skilled in the art will readily appreciate that variations may be made to the specific values and component types without departing from the spirit or scope of the present invention. Thus, the specific components identified in Table I below are intended to be an illustration only, and the present invention is not intended to be limited to any specific circuit components.

The components set forth in Table I below are identified by the same reference numerals which are used in FIGS. 6, 6A and 7. Resistance is stated in ohms; and capacitance is stated in microfarads.

TABLE I

LISTING OF CIRCUIT COMPONENTS

| Capacitors | |
|---|---|
| No. | Capacitance |
| C1 | 0.1 |
| C2 | 10 |
| C3 | 0.01 |
| C4 | 10 |
| C5 | 0.05 |

| Resistors | |
|---|---|
| No. | Resistance |
| R1 | 2.7K |
| R2 | 470K |
| R3 | 18K |
| R4 | 10K |
| R5 | 1K |
| R6 | 470 |
| R7 | 10K |
| R8 | 2.7K |
| R9 | 10K |
| R10 | 16K |

| Diodes | |
|---|---|
| No. | Type |
| D1 | 1N914A |

| Transistors | |
|---|---|
| No. | Type |
| Q1 | 2N4124 |

| Analog Gates | |
|---|---|
| S1 | 4066 |
| S2 | 4066 |

| Integrated Circuits | |
|---|---|
| No. | Type |
| U1A-U1D | LM324 |
| U2A-U2B | LM324 |
| U5 | 74LS241 |
| U6 | Z80 |
| U7 | 74LS32 |
| U8 | 2716 |
| U9 | 74LS123 |

3. The System Operation

Figure 8F:
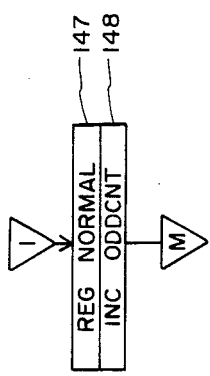
FIGS. 8 through 8H are flow chart diagrams representing the method of operation of one presently preferred embodiment of the present invention.
Figure 8G:
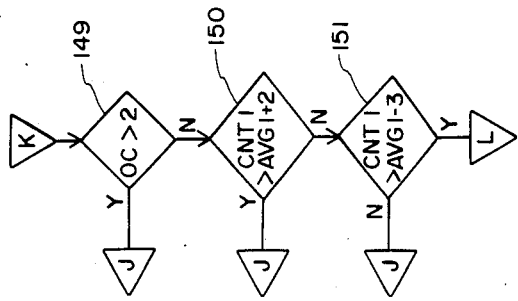
Figure 8H:
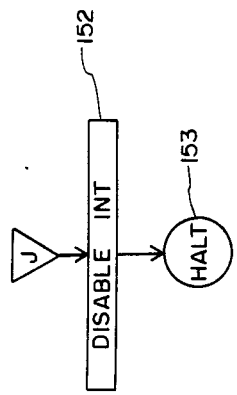

One presently preferred embodiment of the method of operation of the present invention is illustrated by the flow chart of FIGS. 8 through 8H. Those skilled in the art will readily appreciate that other specific methods may be used in accordance with the present invention and that the flow chart of FIGS. 8 through 8H may be modified without departing from the scope of the present invention.

Moreover, the flow chart of FIGS. 8 through 8H illustrates one way of implementing the present invention using a Z80 microprocessor and taking advantage of the particular characteristics of that type of microprocessor. Such characteristics include, for example, the availability of internal registers for storing the results of the data analysis which is performed during the course of the system's operation. Thus, the following description of the flow chart of FIGS. 8 through 8H is intended by way of illustration only, and not limitation.

Furthermore, the flow chart of FIGS. 8 through 8H is described as it would be implemented in the form of computer software. Those skilled in the art will readily appreciate that the method could also be implemented in the form of system hardware, and such hardware implementation is also within the scope of this invention.

With reference to FIG. 8, the system will begin operating at step 100 as soon as CPU 30 is enabled (see FIGS. 5 and 7). The system then moves immediately to step 101 and initializes all registers which will be used to store data during sampling and analysis.

Next, the system moves to step 102 and determines whether audio is initially present on the incoming audio line. The system thus samples line 42 of FIGS. 5 through 7 to determine whether audio detector 20 indicates that an audio signal is present. If audio is initally present, the system remains at step 102. If audio is not initially present, or as soon as audio detector 20 indicates that no audio is now present, the system moves to step 103.

At step 103, the system again determines whether audio is present by reading the output of audio detector 20. As long as no audio is present, the system stays at step 103. Once audio is detected, the system moves immediately to step 104.

Steps 102 and 103 are designed to ensure that the audio data is sampled from the beginning of an audio signal, rather than at the end or in the middle of a signal. In this way, erroneous readings which might otherwise result from sampling only the tail end of an audio signal can be eliminated.

At step 104, a storage register within the microprocessor which is hereinafter referred to as the window counter is loaded with a numerical value equal to N+2. As illustrated in FIG. 3, N is the number of frames which will be included within a window. Thus, N may be any suitable number, such as, for example, 13. In such case, the window counter would initially be set to a value of 15 at step 104.

The system next moves to step 105, and a storage register which is hereinafter called the odd counter is set to a value of 0. As described more fully below, the odd counter will be used to indicate the number of odd frames within a given window wherein the data sampled is significantly different from the average data characteristic for that window. Thus, the odd counter will be incremented whenever the system determines that it is possible that voice signals are present.

After initializing the odd counter, the system moves to step 106 and initializes a storage register which is hereinafter called the transition counter. Throughout this flow chart, it will be assumed that the system is analyzing the data by determining the number of low to high transitions in the digitized audio signal during each frame. During the analysis, therefore, the transition counter will keep track of the number of such transitions; and the transition counter is thus initially set to a value of 0 at step 106.

The system next moves to step 107 and sets a storage register which is hereinafter called the frame counter to a value of S. The frame counter is used to keep track of the number of samples which have been taken during a given frame. Thus, the number S indicates the number of samples to be taken during each frame and may be set to any suitable number in step 107, such as, for example, 132.

The system then moves to step 108 and resets to zero one bit of a storage register which is hereinafter called the transition flag. As will become more readily apparent from the discussion which follows, the transition flag indicates whether the digitized audio signal was high or low the last time it was sampled. Thus, the transition flag will be used to determine whether a low to high transition has occurred.

Next, the system moves to step 109 and enables the interrupt function of CPU 30 (see FIGS. 5 and 7). At this point, the system will begin to recognize an interrupt signal which is present on line 37 of FIG. 7. As set forth more fully below, such an interrupt signal indicates that a data sample should now be taken by the system.

After enabling the interrupt, the system moves to step 110 and initializes the "stack." Actually, the system described and illustrated herein does not use any memory space which could be characterized as a "stack." However, a stack is initialized at step 110 in order to provide an unused memory address to which the system can write when it is interrupted.

Normally, when a microprocessor system is interrupted, it automatically records an address indicating the memory location to which the processor should return after it has completed the interrupt routine. However, as will be seen from the discussion which follows, such a return address is not required by the present system, but a "phantom" stack is provided so as to avoid potential conflict on the data bus should CPU 30, when interrupted, attempt to write to memory device 32.

After completing step 110, the system repeats steps 109 and 110 until an interrupt signal is received. Upon receiving an interrupt signal, the system immediately moves to step 111 of FIG. 8A.

It should be noted that, when the system is first enabled, an interrupt signal will initially be present, since a low voltage signal will be present on line 37 of FIG. 7. Therefore, the first time that the system reaches step 109 it will immediately recognize the interrupt signal and jump to step 111.

At step 111, the system restarts the interrupt timer 34 (see FIGS. 5 and 7). Referring to FIG. 7, at step 111, CPU 30 sends a signal on line 36 to timer 34 such that interrupt line 37 is then maintained at a high voltage level for a time period determined by capacitor C3 and resistor R10. This procedure will enable the system to take data samples at regular intervals, as will be explained more fully below.

Following step 111, the system moves to step 112 and decrements the frame counter. This indicates that the system is about to take a sample, and the value in the frame counter now indicates the number of additional samples which will need to be taken during the current frame. From step 112, the system moves to step 113 and determines whether the frame counter is equal to 0. In other words, the system determines at step 113 whether all of the samples in the current frame have been taken. If all of the samples have not been taken, the system moves to step 122 of FIG. 8B, as indicated by the flags labeled "B."

At step 122, the system determines whether the digitized audio data generated by digitizer 24 is high at that moment in time. In other words, the system samples the signal from line 44 of FIGS. 5 through 7 and determines whether the digitized audio signal at that point in time is a high voltage signal or a low voltage signal.

If the audio signal is not a high signal, the system then moves directly to step 123 and resets the transition flag. As indicated by the flags labeled "A," the system then returns to step 109 of FIG. 8 to await the next interrupt.

If the instantaneous signal from digitizer 24 is high at step 122, the system moves to step 124. At step 124, the system determines whether a low to high transition has taken place. In other words, the system determines whether the digitized audio signal was at a low voltage level the last time it was sampled. This is done by examining the transition flag. If the transition flag is 0, this is an indication that the last audio signal sampled was a low value and that a transition has, therefore, taken place. If the transition flag is set to 1, on the other hand, this is an indication that the last audio signal sampled was also at a high value and that there has been no transition.

If it is determined at step 124 that a transition from a low voltage level to a high voltage level has occurred, the system moves to step 125 and sets the transition flag to a value of 1. As set forth above, this indicates that the audio signal just sampled was at a high voltage level.

The system then moves to step 126 and increments the transition counter to indicate that a low to high transition has taken place. Thereafter, the system returns to step 109 of FIG. 8 to await the next interrupt, as indicated by the flags labeled "A."

If it is determined at step 124 that no transition has taken place, the system moves to step 127. This would be the case when the audio signal just sampled has a high value and the last audio signal sampled was also a high value. At step 127, the transition flag is set to normal, that is, it is reset to the same state it was in before step 124. The system then returns to step 109 of FIG. 8 to await the next interrupt, as indicated by the flags labeled "A."

As indicated above, prior to taking each sample, the interrupt timer is restarted at step 111, which means that a pulse is sent on line 36 of FIG. 7 to timer 34 so as to bring line 37 of FIG. 7 high for a time period determined by capacitor C3 and resistor R10. When a sample is taken, therefore, the steps illustrated in FIG. 8B will be executed, and the system will then return to step 109 of FIG. 8. When the system returns to step 109, line 37 of FIG. 7 will still be high. The system will then continuously execute steps 109 and 110 of FIG. 8 until line 37 of FIG. 7 goes low, at which time the system will again jump to step 111 of FIG. 8A, as explained above.

It will be appreciated from the foregoing, therefore, that the time constant determined by capacitor C3 and resistor R10 of FIG. 7 determines the time between successive samplings of the output from digitizer 24 (see FIGS. 5, 6 and 6A). For example, C3 and R10 may be selected such that a sample is taken every 160 microseconds. Of course, other suitable time durations could also be chosen, as desired.

The system will continue to take samples as set forth above and keep track of the number of low to high transitions until all of the samples in a frame have been taken. That will be determined by the system at step 113 of FIG. 8A.

If the system determines at step 113 that all of the samples in a frame have been taken, the system will move to step 114. At step 114, the system determines whether the window counter is less than or equal to the number of frames which are to be included within the window.

It will be recalled that at step 104 the window counter was set to a value of two greater than the number of frames in the window. In this way, two frames could be ignored prior to the beginning of the window. Of course, the window counter could be set at step 104 to any value greater than or equal to the number of frames to be included in the window such that more or less than two frames are ignored prior to the commencement of the window, as desired.

If it is determined at step 114 that the window counter is not less than or equal to the number of frames in the window, this is an indication that the frame which has just been completed is to be ignored. Accordingly, the system then moves to step 115 and decrements the window counter and then returns to step 106 of FIG. 8, as indicated by the flags labeled "C." Beginning at step 106, the transition counter and frame counter and transition flag are all reset such that a new frame can be started. The system then moves to steps 109 and 110 to await an interrupt signal indicating the beginning of the next frame and that the first sample of that frame should be taken.

After the first two frames have been ignored, the system will determine at step 114 that the window counter is equal to the number of frames to be included in the window. Accordingly, the system will then go to step 116.

At step 116, the system determines whether the window counter is exactly equal to the number of frames to be included in the window. If so, this will indicate that the frame just completed is the first frame in this window for which data is to be analyzed. If it is determined at step 116 that this is the first frame of data to be analyzed, the system moves to step 117.

At step 117, it is determined whether the value in the transition counter is greater than four. That is, whether there were more than four low to high transitions during that frame. If it is determined that there were not more than four transitions, this frame will be discarded and an entirely new window will be commenced, in that the system will then move immediately to step 104 of FIG. 8, as indicated by the flags labeled "F."

The purpose of the determination in step 117 is to eliminate the data due to "clicks" or other voltage spikes on the telephone lines. A click may sometimes be heard on the telephone lines when a call is being routed through several central offices of the telephone system, and such clicks will be perceived as an audio signal. Accordingly, the system will begin sampling. However, there will be relatively few low to high transitions during that frame, since the "click" or spike will not result in any sustained audio signal on the telephone lines. Hence, step 117 is intended to eliminate potentially erroneous results which could otherwise occur due to such clicks or other voltage spikes.

Accordingly, as outlined above, if it is determined at step 117 that fewer than four transitions were detected during a given frame, the window counter and odd counter will be initialized at steps 104 and 105, respectively, thereby indicating the beginning of a new window. The system will then move through steps 106 through 108 and down to steps 109 and 110, where the system will again wait for an interrupt signal to begin sampling. Of course, any suitable number either greater or less than four could be used as the test criterion at step 117. The appropriateness of using any particular number will depend upon the number of samples being taken during each frame.

If it is determined at step 117 of FIG. 8A that more than four low to high transitions occurred during the frame, the system will move to step 118 and save the transition counter value in a separate storage register. The transition counter value is saved so that it can be averaged with the value obtained during the next frame and so that the average value can then be compared with the transition counter value resulting from subsequent frames.

Following step 118, the system initializes the transition counter and odd counter in step 119 and resets the frame counter to the appropriate value in step 120. Finally, the window counter is decremented at step 121, indicating that the first frame from which data is to be analyzed has now been completed. Thereafter, the system returns to steps 109 and 110 of FIG. 8, as indicated by the flags labeled "A."

Once the first frame of data which is to be analyzed has been saved in step 118, as set forth above, the system is ready to begin taking samples which will comprise the second frame of data to be analyzed. This data will be taken in exactly the same manner as set forth above, as the system executes the appropriate steps illustrated in FIG. 8B. Then, when the system determines in step 113 that all of the samples in this second frame have now been taken, the system will again move to step 114, and from step 114 to 116.

At step 116, the system will now determine that the window counter is not exactly equal to the total number of frames to be included in the window. This is due to the fact that the window counter was previously decremented below the value of the total number of frames in the window as a result of step 121. Therefore, the system will now move to step 128 of FIG. 8C, as indicated by the flags labeled "D."

At step 128, the system will determine whether the window counter is equal to one less than the number of frames in the window. In other words, step 128 determines whether this is the second frame in the window for which data is to be analyzed. If it is determined at step 128 that this is the second frame of data in the window which is to be analyzed, the system moves to step 129 of FIG. 8D, as shown by the flags labeled "G."

At step 129, it is again determined whether the value in the transition counter is greater than four. Step 129 serves the same purpose as step 117 in eliminating potentially erroneous results due to clicks and other voltage spikes on the telephone lines. Thus, if the transition counter does not have a value greater than four, the system would again return to step 104 and begin a new window, as outlined above.

If the value in the transition counter in the second frame is, however, greater than four, the system would move to step 130 and calculate the average value of the transition counter for the first and second frames. In step 131, the calculated average value would then be stored in a register hereinafter called CNT 1. In step 132, a value of two greater than the average value would be stored in a register hereinafter called CNT 2; and a value of three less than the average value would be stored in a register hereinafter called CNT 3 in step 133.

In step 134, the transition counter and odd counter are reset to zero. The frame counter would be reset to indicate the appropriate number of samples in step 135. Finally, the window counter would be decremented in step 136 to indicate the completion of another frame. The system would then return to steps 109 and 110 of FIG. 8, as indicated by the flags labeled "A."

Upon receiving the next interrupt, the system would again take samples and count the low to high transitions until the completion of the next frame. The system would then move through steps 114 and 116 of FIG. 8A to step 128 of FIG. 8C, as explained previously.

At step 128, the system would again determine whether the window counter is equal to one less than the total number of frames in the window. However, since this is now the third frame in the window, the value of the window counter is now two less than the total number of frames in the window. Accordingly, the system would move to step 137 of FIG. 8E, as indicated by the flags labeled "H."

At step 137, it is determined whether the transition counter for the present frame is less than the value stored in the register CNT 2. It will be remembered that the value stored in CNT 2 is two greater than the average number of transitions in the first two frames. Thus, step 137 is determining whether the number of transitions in the present frame are less than the upper limit which is stored in CNT 2.

If the transition counter is not less than the upper limit stored in CNT 2, the system moves directly to step 147 of FIG. 8F, as indicated by the flags labeled "I." Step 147 will be explained in more detail below.

If, on the other hand, the transition counter is found in step 137 to be less than the upper limit stored in register CNT 2, the system moves to step 138. At step 138, the system determines whether the value of the transition counter is greater than the lower limit which is stored in register CNT 3.

It will be remembered that the lower limit which was stored in register CNT 3 in step 133 is equal to three less than the average number of transitions for the first two frames in the window. Thus, at step 138 it is determined whether the number of low to high transitions in the present frame is greater than that lower limit. If it is determined that the value in the transition counter is not greater than the designated lower limit, the system then moves immediately to step 147 of FIG. 8F, as indicated by the flags labeled "I."

Figure 8E:
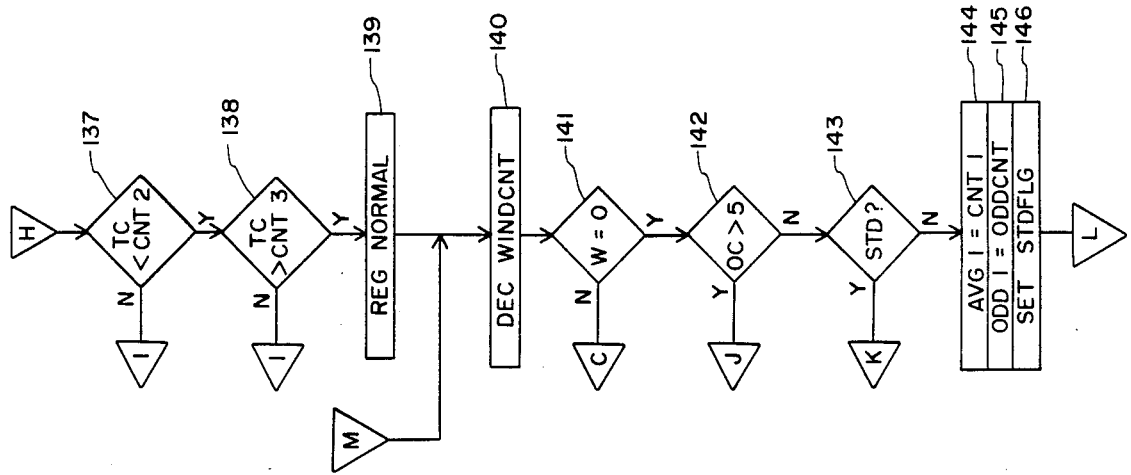
Figure 8C:
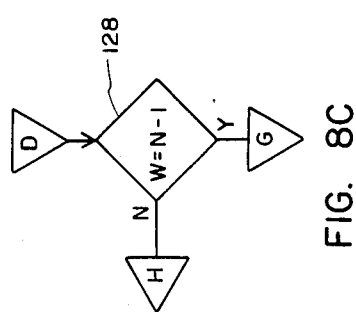

Steps 137 and 138 of FIG. 8E are, therefore, steps which determine whether the number of low to high transitions in the present frame are within acceptable limits of the average number of transitions in the first two frames of this window. If the number of transitions is not within acceptable limits, the system moves to step 147 of FIG. 8F. If, on the other hand, the number of transitions is within acceptable limits, the system moves to step 139 where the registers are returned to normal and the system may continue its analysis.

Figure 8D:
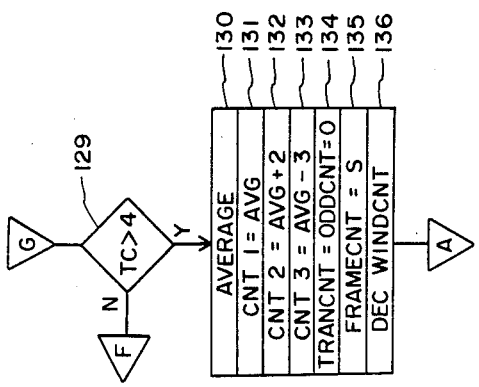

It will be appreciated that any of a number of upper and lower limits could be established in steps 132 and 133 of FIG. 8D. However, the upper and lower limits specified in steps 132 and 133 of FIG. 8D represent the presently preferred values.

As set forth above, if it is determined at either step 137 or step 138 that the number of transitions in the present frame is not within the designated limits, the system moves to step 147 of FIG. 8F. At step 147, the registers are again returned to their normal values, and the system moves to step 148.

At step 148, the odd counter is incremented. The odd counter, as explained above, is used to keep track of the number of frames in which the number of low to high transitions varied significantly from the average number of low to high transitions which was calculated from the first two frames in the window. Thus, at step 148, the odd counter is incremented to indicate that the number of transitions in the present frame was not within the designated, acceptable limits, and the system then returns to step 140 of FIG. 8E, as indicated by the flags labeled "M."

At step 140, the window counter is decremented to indicate the completion of another frame in the window. The system then moves to step 141.

At step 141, it is determined whether the window counter is equal to zero. In other words, at step 141 a determination is made as to whether all of the frames in the window have been completed. If all of the frames have not been completed, the system returns to step 106 of FIG. 8, as indicated by the flags labeled "C," such that a new frame can be started, as outlined above.

The system thus continues to take samples and complete frames and to compare the number of low to high transitions in each frame with the average value calculated from the first two frames until all of the frames in the window have been completed. With each comparison, the odd counter is incremented at step 148 of FIG. 8F if it is determined that the number of low to high transitions in a given frame is significantly different from the average number of transitions calculated from the first two frames in the window.

At the completion of all of the frames in the window, the system moves from step 141 of FIG. 8E to step 142. At step 142, it is determined whether the odd counter has a value greater than five. That is, whether more than five frames within the window had low to high transitions which were significantly different from the average value for that window. If such is the case, it is assumed that the telephone has been answered and that the audio signal detected is a voice signal. Accordingly, the system moves to step 152 of FIG. 8H, as shown by the flags designated "J." Step 152 will be described in more detail below.

If it is determined at step 142 that the odd counter does not have a value greater than five, the system moves to step 143. At step 143, it is determined whether a standard has yet been set. A standard is set during the first window after the system is first enabled. Thus, after the completion of the first window, a standard would not have been set and the system would, therefore, move to step 144.

At step 144, the system stores the average number of low to high transitions which was calculated for that window, which was previously stored in register CNT 1, in another register hereinafter designated AVG 1. The system then moves to step 145 and stores the value of the odd counter in a register hereinafter designated ODD 1. Finally, the system moves to step 146 and sets one bit of a register which is hereinafter called the standard flag to indicate that a standard has now been set. The system then returns to step 102 of FIG. 8 to begin a new window, as indicated by the flags labeled "L."

At the completion of each window, the odd counter is again tested at step 142 of FIG. 8E. If the value of the odd counter is greater than five, the system again moves to step 152 of FIG. 8H, as indicated previously. However, if the value of the odd counter is not greater than five, the system again moves to step 143.

At this point, the system will determine at step 143 that a standard has now been set. Thus, the system will move to step 149 of FIG. 8G, as indicated by the flags labeled "K."

At step 149, it is determined whether the odd counter is greater than two. In other words, it is determined whether three or more frames in the window had a number of low to high transitions which was significantly different from the average value determined during the first two frames of that window. If such is the case, the telephone is presumed to have been answered and the system moves to step 152 of FIG. 8H.

If the value of the odd counter is not greater than two, the system moves to step 150 and determines whether the average number of low to high transitions which was calculated for the present window is greater than two more than the average number of transitions which was calculated for the first window. In other words, step 150 is determining whether the window which has just been completed had significantly more low to high transitions than the first which was analyzed. If so, the system again moves to step 152, as indicated by the flags labeled "J."

If the average number of low to high transitions for the present window is not significantly greater than the average number of low to high transitions in the first window, the system then passes to step 151. Step 151 is designed to determine whether the number of low to high transitions is significantly less for the present window than for the first window. Thus, if the average number of transitions for the present window, which is stored in register CNT 1, is not greater than three less than the average value determined for the first window, the system again goes to step 152 of FIG. 8H. If, however, it is determined at step 151 that the average value for the present window is not significantly less than the average number of transitions for the first window, the system returns to step 102 of FIG. 8 to begin a new window, as indicated by the flags labeled "L."

As set forth above, the data collected during each window is analyzed at several points to determine whether there are significant variations in the number of low to high transitions, either within the window itself or between the present window and the first window, to justify the conclusion that the audio signal on the telephone lines cannot be a supervisory or call progress tone but must be a voice signal. If at any of these determining points, it is determined that the difference is significant enough to warrant that determination, the system jumps to step 152 of FIG. 8H.

It will be readily appreciated, of course, that a number of different standards could be set to determine when one is justified in concluding that voice signals are present on the telephone lines. Thus, the standards illustrated in the figures herein are not intended by way of limitation but only by way of example. Those criteria do, however, represent the presently preferred system operation.

Thus, as indicated at step 142, it will not be concluded that voice signals are present on the telephone lines during the first window of sampling unless more than five frames of that window have a number of low to high transitions which is significantly different from the average number calculated from the first two frames in that window. On subsequent windows, however, voice signals will be presumed to be present if there are only three or more frames in the window which are significantly different from the average. Thereafter, subsequent windows will also be compared with the first window of data analyzed, and it will be concluded that voice signals are present if the average number of low to high transitions calculated for the present window is either significantly greater than or significantly less than the average number of low to high transitions which was calculated for the first window. Once any of these criteria are met, the system moves to step 152 of FIG. 8H, as explained previously. At step 152 the interrupt function is disabled, thereby indicating to the microprocessor that all further interrupts are to be ignored and that no further samples are to be taken. The system then moves to step 153.

At step 153, the system executes a halt instruction. With the hardware illustrated in FIG. 6 herein, a halt instruction will cause contact point 50 to go low. This low value can, therefore, be detected by associated circuitry and will indicate that the answer detection device and method of the present invention has detected that voice signals are present on the telephone lines and that the telephone has, therefore, been answered. The associated circuitry can then be activated to transmit an appropriate audio message to the called party.

One presently preferred embodiment of a set of operating instructions which is designed to accomplish the foregoing steps and objectives is set forth in the Appendix hereto. The instructions listed therein were designed to be executed by a Z80 microprocessor. It will be readily appreciated that other specific instructions could achieve the same result. Thus, the specific listing set forth in the Appendix is intended by way of example only.

Figures 9, 9A:
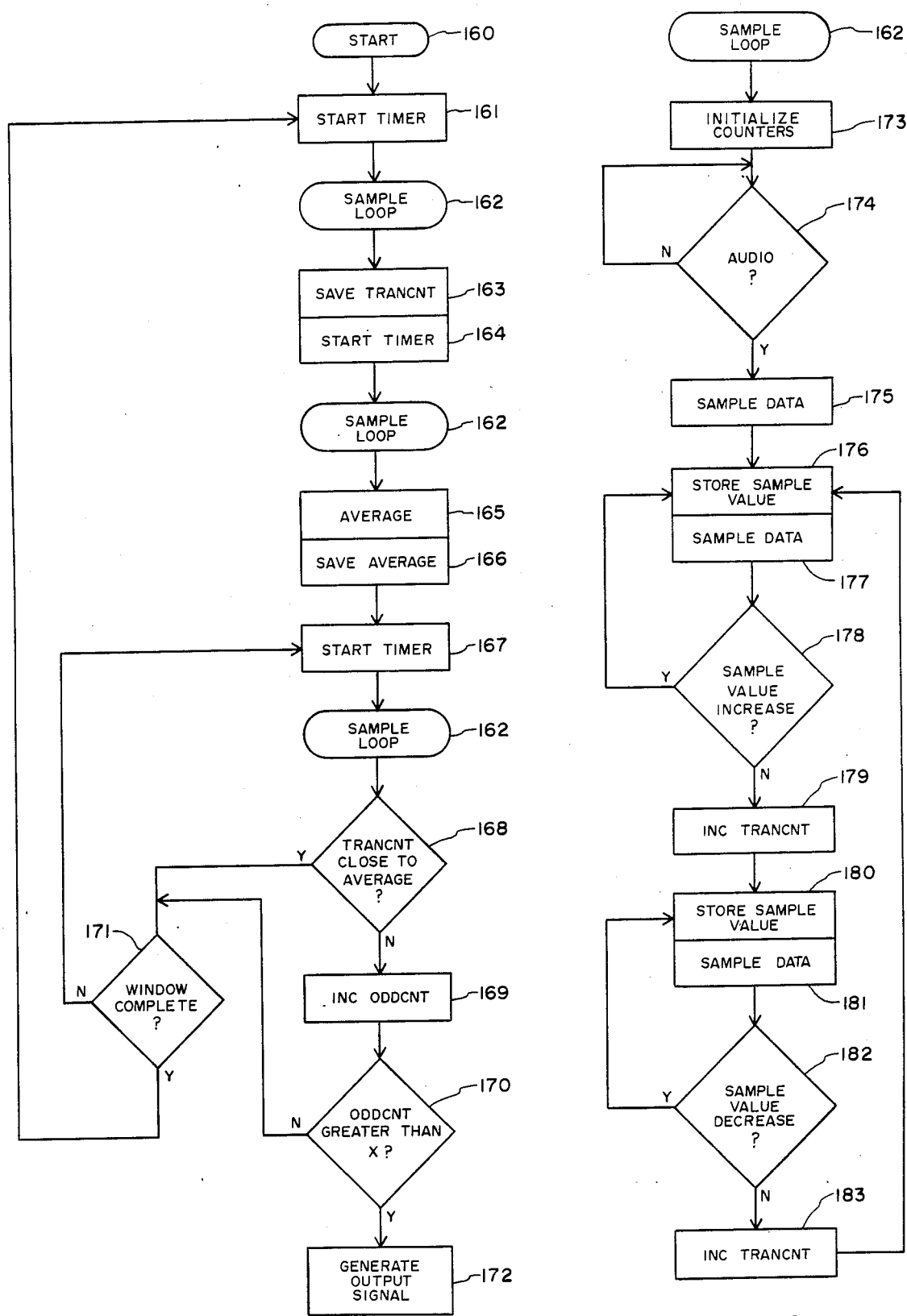
FIGS. 9 and 9A are flow chart diagrams representing the method of operation of a second presently preferred embodiment of the present invention.

A second presently preferred embodiment of the method of operation of the system of the present invention is illustrated in FIGS. 9 and 9A. FIGS. 9 and 9A illustrate one way in which the present invention can be carried out using a conventional analog-to-digital converter wherein the incoming electrical signals are converted directly to a digital, numerical value which is proportional to the instantaneous voltage level of the incoming electrical signal. The numerical values are then analyzed by CPU 30 to determine whether the electrical signal has a regular periodic pattern or is a random electrical signal.

Referring to FIG. 9, the system begins at step 160 and starts an interrupt timer at step 161. The system then moves to step 162.

As shown in FIG. 9A, step 162 commences a sample loop during which samples of the digitized data are taken. Thus, the system initially resets all counters at step 173 and then determines whether audio signals above a given energy threshold level are present at step 174. If such audio signals are not present, the system remains at step 174.

As soon as audio is detected, the system moves to step 175 and samples the digitized data. At step 176, the system then stores the sample value just taken and takes an additional sample at step 177.

At step 178, the system determines whether the sample value just taken is greater than the first sample value taken. In other words, the system determines whether the instantaneous voltage level of the incoming audio signal is increasing. If so, the system returns to step 176 and repeats steps 176 through 177 until it is determined at step 178 that the sample value is not increasing.

At that point, the system moves to step 179 and increments a transition counter. The system then moves to step 180 and stores the sample value just taken and takes an additional sample in step 181.

At step 182, the system now determines whether the sample values are decreasing. In other words, the system determines whether the instantaneous voltage level of the incoming electrical signal is decreasing over time. If so, the system returns to step 180 and step 181 until it is determined at step 182 that the sample value is not decreasing.

Upon such a determination at step 182, the system moves to step 183 and again increments a transition counter. The system then returns to step 176 and proceeds as outlined above.

It will, therefore, be appreciated that the steps illustrated in FIG. 9A are designed to count the number of times the slope of the incoming electrical signal changes from positive to negative and from negative to positive. The system is thus counting the number of relative maxima and minima of the voltage curve of the incoming electrical signals.

The steps illustrated in FIG. 9A are continued indefinitely until the timer which was set at step 161 in FIG. 9 indicates that sampling is to cease. At that point, the system moves to step 163 of FIG. 9 and saves the value in the transition counter.

Thereafter, at step 164, the system again starts a timer and then again proceeds to step 162 of FIG. 9A and takes samples in the manner previously outlined.

As soon as the timer again indicates that sampling is to cease, the system now returns to step 165 of FIG. 9 and determines the average value of the transition counter over the two periods of sampling. That average value is then saved at step 166.

At step 167, the timer is again started and the system then proceeds again to step 162 of FIG. 9A and takes samples. Upon completing the sample taking as indicated by the timer, the system now returns to step 168 of FIG. 9 and determines whether the value in the transition counter is sufficiently close to the average value which was calculated at step 165. If so, the system moves to step 171 which will be described below.

If it is determined at step 168 that the value in the transition counter is not sufficiently close to the average value previously calculated, the system moves to step 169 and increments an odd counter. Then, the system proceeds to step 170 to determine whether the odd counter value is greater than some predetermined reference value (x).

If the odd counter is not greater than the predetermined reference value, the system moves to step 171 and determines whether the window has yet been completed. If not, the system returns to step 167 and proceeds as outlined above. If the window is completed, the system moves to step 161 to begin a new window.

As soon as the system determines at step 170 that the value in the odd counter is greater than the specified reference value such as, for example, five, the system moves to step 172. At step 172, the system generates some output signal indicating the presence of random, irregular electrical signals.

4. Summary

From the above discussion, it will be appreciated that the present invention provides a dependable voice detection apparatus and method for detecting that a called telephone has been answered. Since the answer detection device and method of the present invention uses only those signals which are normally present on the telephone lines, the present invention provides an apparatus and method for detecting that a called telephone has been answered which does not require any special action on the part of the called party. Moreover, the answer detection device and method of the present invention does not require the installation or use of any special equipment in connection with the called telephone. Importantly, the answer detection device and method of the present invention can be used on any telephone system, because it both establishes a different reference standard each time it is used and it is designed to consider only the regularity of the incoming audio tones and not the specific timing or other characteristics of any such tones.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

APPENDIX

```
0000              1000  ;******************************************  *********************
0000              1010  ;
0000              1020  ; ANSWER3 ASSEMLES TO ANS3OBJ
0000              1030  ;
0000              1040  ; LISTING #               1
0000              1050  ; TIME:           2:55 PM
0000              1060  ; DATE:           8-23-84
0000              1070  ; SUPERCEEDS #            0
0000              1080  ;
0000              1090  ;*********************************************************
0000              1100  ; PROGRAM IS USED TO DETECT IRREGRULARITIES IN HIGH TO LOW TRANSITION
0000              1110  ; OF A PARTICULAR DATA LINE. THIS IS DONE BY LOOKING AT 13 FRAMES
0000              1120  ; WHICH ARE 16.5 MS AND COMPRISE OF ONE WINDOW.
0000              1130  ;
0000              1140  ;*********************************************
0000              1150  ;
0000              1160  ;        EQUATE STATMENTS
0000              1170  ;
0000              1180  ;*********************************************
0000              1190  ;
0000              1200  FRAMECNT  EQU    255            YIELDS 20.4MS/FRAME.
0000              1210  WINDCNT   EQU    13             YIELDS 306 MS/WINDOW.
0000              1220  PORT      EQU    1800H
0000              1230  STACK     EQU    48FFH
0000              1240  INTERUPT  EQU    2800H
0000              1250  ;*********************************************
0000              1260  ;
0000 16 FF        1270  START     LD     D,FRAMECNT
0002 1E 0F        1280            LD     E,WINDCNT+2
0004 01 00 00     1290            LD     BC,0           INIT ODDCNT AND TRANCNT TO 0.
0007 31 FF 48     1300            LD     SP,STACK
000A 08           1310            EX     AF,AF'
000B AF           1320            XOR    A
000C 08           1330            EX     AF,AF'         SHOW NO STANDARD YET.
```

```
000D ED 56       1340              IM       1
000F C3 F8 00    1350              JP       AUDWAIT
0012 FB          1360  LOOP        EI
0013 31 FF 48    1370              LD       SP,STACK
0016 18 FA       1380              JR       LOOP
0018             1390              DEFS     0038H-$
0038             1400  ;
0038             1410  ; WHEN THE SAMPLE CLK GOES HIGH THE FRAMECNT IS TESTED FOR END.
0038             1420  ;
0038 32 00 28    1430  FRAMCHK     LD       (INTERUPT),A    SET UP NEXT INTERUPT FOR 166 MICRO SEC LATER.
003B 15          1440              DEC      D               DEC FRAME COUNTER.
003C C2 CD 00    1450              JP       NZ,FRMOK
003F 3E 0D       1460              LD       A,WINDCNT
0041 BB          1470              CP       E
0042 30 03       1480              JR       NC,FRAM1CHK
0044 1D          1490              DEC      E
0045 18 48       1500              JR       REINIT2
0047             1510  ;
0047             1520  ; THIS IS THE END OF THE FRAME, CHECK IF THIS IS THE FIRST FRAME.
0047             1530  ;
0047 3E 0D       1540  FRAM1CHK    LD       A,WINDCNT
0049 BB          1550              CP       E
004A 28 4E       1560              JR       Z,FRM1
004C             1570  ;
004C             1580  ; THE FIRST FRAME HAS PASSED, WAS IT THE SECOND FRAME?
004C             1590  ;
004C 3D          1600  FRM2CHK     DEC      A
004D BB          1610              CP       E
004E 28          1620              JR       Z,FRM2
0050             1630  ;
0050             1640  ; AN AVERAGE WAS ALREADY OBTAINED AND STORED IN CNT1, NOW CHECK IF THE
0050             1650  ; NEW TRANSITION COUNTER IS WITHIN PLUS OR MINUS 3 OF THE AVERAGE STORED
0050             1660  ; IN CNT1. THIS IS ACCOMPLISHED BY COMPARING IT WITH CNT 2 AND CNT3.
0050             1670  ;
0050 79          1680  CNTCHK      LD       A,C
0051 D9          1690              EXX
0052 5F          1700              LD       E,A
0053 79          1710              LD       A,C
0054 BB          1720              CP       E
0055 38 04       1730              JR       C,AUDODD
0057 7A          1740              LD       A,D
0058 BB          1750              CP       E
0059 38 04       1760              JR       C,WNDWCHK
005B             1770  ;
005B             1780  ; THE TRANSITION COUNT WASN'T WITHIN 3 OF THE AVERAGE THEREFORE
005B             1790  ; INCREMENT THE ODD COUNTER, REGISTER B.
005B             1800  ;
005B D9          1810  AUDODD      EXX
005C 04          1820              INC      B
005D 18 01       1830              JR       WNDWCHK2
005F             1840  ;
005F             1850  ; NOW CHECK IF THE WINDOW IS OVER, IF IT IS THE ODD COUNTER WILL BE
005F             1860  ; CHECKED AND A DECISION MADE IF IT WAS AN ANSWER.
005F             1870  ;
005F D9          1880  WNDWCHK     EXX
0060 1D          1890  WNDWCHK2    DEC      E
0061 20 2C       1900              JR       NZ,REINIT2
0063             1910  ;
0063             1920  ; CHECK IF THIS WINDOW SHOULD BE A STANDARD.
0063             1930  ;
0063 3E 05       1940  STDCHK      LD       A,5
0065 B8          1950              CP       B
0066 DA CB 00    1960              JP       C,ANSWER
0069 08          1970              EX       AF,AF'
006A 6F          1980              LD       L,A
006B 08          1990              EX       AF,AF'
006C CB 4D       2000              BIT      1,L
006E CA ED 00    2010              JP       Z,STANDARD
0071             2020  ;
0071             2030  ; THE WINDOW IS OVER, MAKE A DECISION.
0071             2040  ;
0071 3E 02       2050  DECISION    LD       A,2
0073 B8          2060              CP       B
0074 DA CB 00    2070              JP       C,ANSWER
0077 D9          2080              EXX
0078 58          2090              LD       E,B
0079 7C          2100              LD       A,H
007A 3C          2110              INC      A
007B 3C          2120              INC      A
007C BB          2130              CP       E
007D 38 4C       2140              JR       C,ANSWER
007F 3D          2150              DEC      A
0080 3D          2160              DEC      A
0081 3D          2170              DEC      A
0082 3D          2180              DEC      A
0083 3D          2190              DEC      A
0084 BB          2200              CP       E
0085 30 44       2210              JR       NC,ANSWER
0087 D9          2220              EXX                      REG BACK TO NORMAL
0088 C3 F8 00    2230              JP       AUDWAIT
008B             2240  ;
008B             2250  ; WASN'T AN ANSWER, REINITIALIZE THE COUNTERS.
008B             2260  ;
008B 1E 0F       2270  REINIT      LD       E,WINDCNT+2
008D 06 00       2280              LD       B,0
008F 0E 00       2290  REINIT2     LD       C,0
```

```
0091 16 FF      2300          LD      D,FRAMECNT
0093 08        2310           EX      AF,AF'
0094 CB 87     2320           RES     0,A
0096 08        2330           EX      AF,AF'
0097 C3 12 00  2340           JP      LOOP
009A          2350 ;
009A          2360 ; SAMPLING OF FRAME 1 JUST ENDED, CHECK IF IT IS A VALID SAMPLE AND
009A          2370 ; IF IT IS SAVE TRANCNT (REG C) IN CNT1 AND REINIT SOME COUNTERS.
009A          2380 ;
009A 3E 04    2390 FRM1       LD      A,4
009C B9       2400            CP      C              IS TRANCNT > 4?
009D 30 0D    2410            JR      NC,FRM1BAD
009F          2420 ;
009F          2430 ; THE SAMPLE WAS ACCEPTABLE, SAVE IT.
009F          2440 ;
009F 79       2450 FRM1SAVE   LD      A,C
00A0 D9       2460            EXX
00A1 47       2470            LD      B,A
00A2 D9       2480            EXX
00A3          2490 ;
00A3          2500 ; REINIT SOME OF THE COUNTERS.
00A3          2510 ;
00A3 01 00 00 2520 SOME       LD      BC,0           REINIT TRANSITION COUNTER.
00A6 16 FF    2530            LD      D,FRAMECNT
00A8 1D       2540            DEC     E
00A9 C3 12 00 2550            JP      LOOP
00AC          2560 ;
00AC          2570 ; FRAME 1 DATA WAS UNACCEPTABLE, REINIT THE COUNTERS.
00AC          2580 ;
00AC 18 DD    2590 FRM1BAD    JR      REINIT
00AE          2600 ;
00AE          2610 ; FRAME 2 JUST ENDED, CHECK FOR A VALID SAMPLE.
00AE          2620 ;
00AE 3E 04    2630 FRM2       LD      A,4
00B0 B9       2640            CP      C              IS TRANSCNT > 4?
00B1 30 D8    2650            JR      NC,REINIT
00B3          2660 ;
00B3          2670 ; THE SAMPLE IS VALID, SAVE IT
00B3          2680 ;
00B3 79       2690 FRM2SAVE   LD      A,C
00B4 D9       2700            EXX
00B5 80       2710            ADD     B
00B6 CB 3F    2720            SRL     A
00B8 47       2730            LD      B,A
00B9 3C       2740            INC     A
00BA 3C       2750            INC     A
00BB 4F       2760            LD      C,A
00BC 78       2770            LD      A,B
00BD 3D       2780            DEC     A
00BE 3D       2790            DEC     A
00BF 3D       2800            DEC     A
00C0 57       2810            LD      D,A
00C1 D9       2820            EXX
00C2 01 00 00 2830            LD      BC,0
00C5 16 FF    2840            LD      D,FRAMECNT     REINIT TRANCNT AND FRMCNT
00C7 1D       2850            DEC     E
00C8 C3 12 00 2860            JP      LOOP
00CB          2870 ;
00CB          2880 ; INDICATIONS ARE THAT THERE WAS AN ANSWER, DISABLE INTERUPTS AND ISSUE
00CB          2890 ; A HALT INSTRUCTION.
00CB          2900 ;
00CB F3       2910 ANSWER     DI
00CC 76       2920            HALT
00CD          2930 ;
00CD          2940 ;SAMPLING STILL IN THE CURRENT FRAME. CHECK IF AUDIO BIT IS LOW, IF IT
00CD          2950 ; IS THEN INC A LOCNTER AND SEE IF TOO MANT ZEROS HAVE COME IF SO THEN
00CD          2960 ; REINIT THE COUNTERS.
00CD          2970 ;
00CD          2980 ; IF HI THE CHECK IF IT WAS A TRANSITION IF NOT RET IF SO INC TRANCNT.
00CD          2990 ;
00CD 3A 00 18 3000 FRMOK      LD      A,(PORT)
00D0 CB 47    3010            BIT     0,A
00D2 20 09    3020            JR      NZ,AUDHI
00D4          3030 ;
00D4          3040 ; IT WAS LOW SO INC THE LOCNT AND CHECK FOR TERMINAL COUNT.
00D4          3050 ;
00D4 18 00    3060 AUDLO      JR      SETLO
00D6          3070 ;
00D6          3080 ; THE AUDIO WAS LO, RESET A FLAG SO A TRANSITION CAN BE DETECTED.
00D6          3090 ;
00D6 08       3100 SETLO      EX      AF,AF'         EXCHANGE ALL OF THE REG
00D7 CB 87    3110            RES     0,A
00D9 08       3120            EX      AF,AF'         PUT IT BACK TO NORMAL.
00DA C3 12 00 3130            JP      LOOP
00DD          3140 ;
00DD          3150 ; THE AUDIO WAS HIGH FIND OUT IF IT WAS A TRANSITION.
00DD          3160 ;
00DD 08       3170 AUDHI      EX      AF,AF'
00DE CB 47    3180            BIT     0,A
00E0 20 07    3190            JR      NZ,NOTRAN
00E2          3200 ;
00E2          3210 ; IT IS A TRANSITION, PUT REG BACK TO NORMAL AND INC TRANCNT, SET LOFLG
00E2          3220 ; AND RESET THE LOCOUNTER.
00E2          3230 ;
00E2 CB C7    3240 TRANS      SET     0,A
00E4 08       3250            EX      AF,AF'
```

```
00E5  0C                      3260            INC     C
00E6  C3 12 00                3270            JP      LOOP
00E9                          3280    ;
00E9                          3290    ; NOT A TRANSITION, PUT REG BACK TO NORMAL AND WAIT.
00E9                          3300    ;
00E9  08                      3310    NOTRAN  EX      AF,AF'
00EA  C3 12 00                3320            JP      LOOP
00ED  1F                      3330    STANDARD EXX
00EE  60                      3340            LD      H,B
00EF  D9                      3350            EXX
00F0  78                      3360            LD      A,B
00F1  D9                      3370            EXX
00F2  6F                      3380            LD      L,A
00F3  08                      3390            EX      AF,AF'
00F4  CB CF                   3400            SET     1,A
00F6  D9                      3410            EXX
00F7  08                      3420            EX      AF,AF'
00F8  3A 00 18                3430    AUDWAIT LD      A,(PORT)
00FB  CB 4F                   3440            BIT     1,A
00FD  20 F9                   3450            JR      NZ,AUDWAIT
00FF  3A 00 18                3460    AUDWAIT2 LD     A,(PORT)
0102  CB 4F                   3470            BIT     1,A
0104  28 F9                   3480            JR      Z,AUDWAIT2
0106  C3 8B 00                3490            JP      REINIT
PROGRAM IS 265 BYTES LONG (2) WITH 0 ERRORS DETECTED.
> SYMBOL LISTING (Y=YES,N=NO)?
ANSWER: 00CB AUDHI=00DD AUDLO=00D4 AUDODD=005B AUDWAIT=00F8 AUDWAIT2=00FF
CNTCHK=0050 DECISION=0071 FRAM1CHK=0047 FRAMCHK=0038 FRAMECNT=00FF
FRM1=009A FRM1BAD=00AC FRM1SAVE=009F FRM2=00AE FRM2CHK=004C FRM2SAVE=00B3
FRMOK=00CD INTERUPT=2800 LOOP=0012 NOTRAN=00E9 PORT=1800 REINIT=008B
REINIT2=008F SETLO=00D6 SOME=00A3 STACK=4SFF STANDARD=00ED START=0000
STUCHK=0063 TRANS=00E2 WINDCNT=000D WNDWCHK=005F WNDWCHK2=0060
```

What is claimed and desired to be secured by United States Letters Patent is:

1. A method for distinguishing between voice signals and system-generated audio signals in an electrical audio device, the method comprising the steps of:
   digitizing an electrical audio signal so as to generate a series of uniform high voltage signals and uniform low voltage signals;
   sampling said digitized electrical audio signal so as to obtain a plurality of samples;
   analyzing the digitized electrical audio samples to determine whether the digitized audio signal has a regular periodic pattern; and
   generating an electrical signal in response to the analyzing step to indicate whether voice signals are present in the electrical audio device.

2. A method as defined in claim 1 wherein the digitizing step comprises generating a high voltage signal whenever the instantaneous voltage level of the electrical audio signal is greater than a specified reference value and generating a low voltage signal at all other times.

3. A method as defined in claim 1 wherein the digitizing step comprises generating a high voltage signal whenever the instantaneous slope of the electrical audio signal is positive and generating a low voltage signal at all other times.

4. A method as defined in claim 1 wherein the sampling step comprises sampling the electrical audio signal during successive time periods.

5. A method as defined in claim 4 wherein the sampling step comprises determining the number of times during each time period that a transition occurs in the digitized audio signal from a low voltage signal to a high voltage signal.

6. A method as defined in claim 4 wherein the sampling step comprises determining the amount of time in each time period during which the digitized audio signal is a high voltage signal.

7. A method as defined in claim 1 wherein the generating step comprises generating a first electrical signal when it is determined that the digitized audio signal has a regular periodic pattern and generating a second electrical signal when it is determined that the digitized audio signal does not have a regular periodic pattern.

8. A method for distinguishing between voice signals and system-generated audio signals in an electrical audio device, the method comprising the steps of:
   (1) digitizing a system-generated audio signal so as to generate a series of uniform high voltage signals and uniform low voltage signals;
   (2) sampling the digitized audio signal during successive time periods;
   (3) establishing a comparison standard during a first time period;
   (4) comparing the digitized audio signal which is sampled during time periods subsequent to said first time period with the comparison standard established during said first time period so as to determine that the digitized system-generated audio signal has a regular periodic pattern;
   (5) generating a first electrical signal in response to steps (2-) (4);
   (6) digitizing a random audio signal so as to generate a series of uniform high voltage signals and uniform low voltage signals;
   (7) determining that the digitized random audio signal does not have a regular periodic pattern; and
   (8) generating a second electrical signal in response to step (7).

9. A method as defined in claim 8 wherein steps (1) and (5) each comprise generating a high voltage signal whenever the instantaneous voltage level of the audio signal is greater than a specified reference value and generating a low voltage signal at all other times.

10. A method as defined in claim 8 wherein steps (1) and (5) each comprise generating a high voltage signal whenever the instantaneous slope of the audio signal is positive and generating a low voltage signal at all other times.

11. A method as defined in claim 8 wherein step (7) comprises:
   (9) sampling the digitized audio signal during successive time periods;
   (10) establishing a comparison standard during a first time period; and

(11) comparing the digitized audio signal which is sampled during time periods subsequent to said first time period with the comparison standard established during said first time period.

12. A method as defined in claim 11 wherein steps (2) and (9) each comprise determining the number of times during each time period that a transition occurs in the digitized audio signal from a low voltage signal to a high voltage signal, and wherein said comparison standard comprises a number which is proportional to the number of times such a transition occurred during the first time period, and wherein steps (4) and (11) each comprise comparing the number of times such a transition occurs during said subsequent time periods with said comparison standard.

13. A method as defined in claim 11 wherein steps (2) and (9) each comprise determining the amount of time in each time period during which the digitized audio signal is a high voltage signal, and wherein said comparison standard comprises a number which is proportional to the amount of time in the first time period during which the digitized audio signal was a high voltage signal, and wherein steps (4) and (11) each comprise comparing the amount of time in said subsequent time periods during which the digitized audio signal is a high voltage signal with said comparison standard.

14. A method for electrical signal discrimination, the method comprising the steps of:
(1) digitizing an electrical signal;
(2) sampling the digitized electrical signal during successive time periods;
(3) establishing a first comparison standard during a first time period;
(4) comparing the digitized electrical signal which is sampled during time periods subsequent to said first time period with said first comparison standard; and
(5) generating an output signal whenever the digitized electrical signal which is sampled during a preselected number of said subsequent time periods varies from the first comparison standard by more than a predetermined amount.

15. A method as defined in claim 14 wherein step (2) comprises determining the number of times during each time period that the instantaneous slope of the electrical signal changes in at least one of the following ways:
from a positive slope to a negative slope; and
from a negative slope to a positive slope.

16. A method as defined in claim 15 wherein said first comparison standard comprises a number that is proportional to the number of such changes in the slope of the electrical signal which occurred during said first time period, and wherein step (4) comprises comparing the number of such changes in the slope of the electrical signal which occur during said subsequent time periods with said first comparison standard.

17. A method as defined in claim 14 wherein step (1) comprises at least one of the following:
generating a high voltage signal whenever the instantaneous voltage level of the electrical signal is greater than a specified reference value and generating a low voltage signal at all other times; and
generating a high voltage signal whenever the instantaneous slope of the electrical signal is positive and generating a low voltage signal at all other times.

18. A method as defined in claim 17 wherein step (2) comprises determining the number of times during each time period that a transition occurs in the digitized electrical signal from a low voltage signal to a high voltage signal, and wherein said first comparison standard comprises a number which is proportional to the number of times such a transition occurred during the first time period, and wherein step (4) comprises comparing the number of times such a transition occurs during said subsequent time periods with said first comparison standard.

19. A method as defined in claim 17 wherein step (2) comprises determining the amount of time in each time period during which the digitized electrical signal is a high voltage signal, and wherein said first comparison standard comprises a number which is proportional to the amount of time in the first time period during which the digitized electrical signal was a high voltage signal, and wherein step (4) comprises comparing the amount of time in said subsequent time periods during which the digitized electrical signal is a high voltage signal with said first comparison standard.

20. A method as defined in claim 17 wherein said first time period is substantially equal in duration to two said subsequent time periods and wherein the first comparison standard comprises at least one of the following:
a number which is equal to approximately one half of the number of times during the first time period that a transition occurred in the digitized electrical signal from a low voltage signal to a high voltage signal; and
a number which is proportional to one half of the amount of time in the first time period during which the digitized electrical signal was a high voltage signal.

21. A method as defined in claim 14 wherein step (2) is preceded by the step of determining whether the electrical signal is above a specified threshold energy level.

22. A method as defined in claim 14 wherein step (2) is preceded by the step of detecting the beginning of an electrical signal which is above a specified threshold energy level.

23. A method as defined in claim 14 further comprising the steps of:
(6) establishing a second comparison standard during a second time period;
(7) comparing the second comparison standard with the first comparison standard; and
(8) generating said output signal whenever the second comparison standard varies from the first comparison standard by more than a predetermined amount.

24. A method for electrical signal discrimination, the method comprising the steps of:
(1) digitizing an electrical signal so as to generate a series of uniform high voltage signals and uniform low voltage signals by means of at least one of the following:
generating a high voltage signal whenever the instantaneous voltage level of the electrical signal is greater than a specified reference value and generating a low voltage signal at all other times; and
generating a high voltage signal whenever the instantaneous slope of the electrical signal is positive and generating a low voltage signal at all other times;

(2) sampling the digitized electrical signal during successive time periods by determining at least one of the following:
- the number of times during each time period that a transition occurs in the digitized electrical signal from a low voltage signal to a high voltage signal; and
- the amount of time in each time period during which the digitized electrical signal is a high voltage signal;

(3) establishing a first comparison standard during a first time period;

(4) comparing the digitized electrical signal which sampled during time periods subsequent to said first time period with the first comparison standard; and (5) generating an output signal whenever the digitized electrical signal during a preselected number of said subsequent time periods varies from the first comparison standard by more than a predetermined amount.

25. A method as defined in claim 24 wherein said first time period is substantially equal in duration to two said subsequent time periods and wherein the first comparison standard comprises at least one of the following:
- a number which is equal to approximately one half of number of times during the first time period that a transition occurred in the digitized electrical signal from a low voltage signal to a high voltage signal; and
- a number which is proportional to one half of the amount of time in the first time period during which the digitized electrical signal was a high voltage signal.

26. A method as defined in claim 24 wherein step (2) is preceded by the step of determining whether the electrical signal is above a specified threshold energy level.

27. A method as defined in claim 24 wherein step (2) is preceded by the step of detecting the beginning of an electrical signal which is above a specified threshold energy level.

28. A method as defined in claim 24 further comprising the steps of:
(6) establishing a second comparison standard during a second time period;
(7) comparing the second comparison standard with the first comparison standard; and
(8) generating said output signal whenever the second comparison standard varies from the first comparison standard by more than a predetermined amount.

29. An apparatus for detecting that a called telephone has been answered, comprising:
- an audio detector device connected to a set of telephone lines;
- a digitizer for transforming electrical audio signals on the telephone lines into a series of uniform high voltage signals and uniform low voltage signals; and
- a digital computing device comprising means for obtaining a plurality of samples from the digitizer, means for storing a comparison standard and comparing successive samples to the comparison standard, and means for analyzing said samples so as to determine whether the output signals from the digitizer represent electrical audio signals having a regular or random pattern.

30. An apparatus as defined in claim 29 wherein the audio detector comprises a comparator which produces a high voltage signal whenever the audio signals on the telephone lines are above a specified threshold energy level.

31. An apparatus as defined in claim 29 wherein the digitizer comprises a voltage comparator which produces a high voltage signal whenever the instantaneous voltage level of the electrical audio signals is greater than a specified reference value and which produces a low voltage signal at all other times.

32. An apparatus as defined in claim 29 wherein the digitizer comprises:
- a frequency source;
- a switching means connected to the frequency source such that the switching means successively opens and closes at the frequency of said frequency source;
- a sample and hold means connected to the switching means such that the sample and hold means is charged to the instantaneous voltage level of the electrical audio signals whenever the switching means is open; and
- a voltage comparator which produces a high voltage signal whenever the instantaneous voltage level of the electrical audio signals is greater than the voltage across the sample and hold means and which produces a low voltage signal at all other times, whereby a high voltage signal is generated whenever the instantaneous slope of the electrical audio signals is positive and a low voltage signal is generated at all other times.

33. An apparatus as defined in claim 29 further comprising a timer connected to the digital computing device for indicating the time periods during which the output signals from the audio detector and the digitizer are to be sampled and analyzed.

34. An apparatus as defined in claim 33 wherein the timer comprises a monostable device.

35. A method as defined in claim 4 wherein the comparing step comprises:
- establishing a comparison standard during a first time period; and
- comparing the digitized audio sample which is sampled during time periods subsequent to said first time period with the comparison standard established during said first time period.

36. A method for distinguishing between voice signals and system-generated audio signals in an electrical audio device, the method comprising the steps of:
- digitizing an electrical audio signal so as to generate a series of uniform high voltage signals and uniform low voltage signals;
- sampling the digitized audio signal during successive time periods;
- establishing a comparison standard during a first time period;
- comparing the digitized audio signal which is sampled during the time periods subsequent to said first time period with the comparison standard established during said first time period to determine whether the digitized audio signal has a regular periodic pattern; and
- generating an electrical signal in response to the analyzing step to indicate whether voice signals are present in the electrical audio device.

37. An apparatus for detecting that a called telephone has been answered, comprising:
- an audio detector device connected to a set of telephone lines;
- a digitizer for transforming electrical audio signals on the telephone lines into a series of uniform high voltage signals and uniform low voltage signals, the digitizer comprising
  - a frequency source;
  - a switching means connected to the frequency source such that the switching means successively opens and closes at the frequency of said frequency source;
  - a sample and hold means connected to the switching means such that the sample and hold means is charged to the instantaneous voltage level of the electrical audio signals whenever the switching means is open; and
  - a voltage comparator which produces a high voltage signal whenever the instantaneous voltage level of the electrical audio signals is greater than the voltage across the sample and hold means and which produces a low voltage signal at all other times, whereby a high voltage signal is generated whenever the instantaneous slope of the electrical audio signals is positive and a low voltage signal is generated at all other times; and
- a digital computing device for sampling and analyzing output signals from both the audio detector and the digitizer so as to determine whether the output signals from the digitizer represent electrical audio signals on the telephone lines having a regular periodic pattern.

* * * * *

UNITED STATES PATENT AND TRADEMARK OFFICE
CERTIFICATE OF CORRECTION

PATENT NO. : 4,667,065

DATED : May 19, 1987

INVENTOR(S) : Richard M. Bangerter

It is certified that error appears in the above-identified patent and that said Letters Patent is hereby corrected as shown below:

Column 2, line 11, "devices 22" should be --devices--
Column 8, line 35, "s specified" should be --a specified--
Column 11, line 52, "line" should be --line 27 may, for example, comprise bit A12 of address bus 33.--
Column 33, lines 13-14, "which sampled" should be --which is sampled--

Signed and Sealed this

Third Day of November, 1987

Attest:

DONALD J. QUIGG

*Attesting Officer*   *Commissioner of Patents and Trademarks*